United States Patent
Sanderovich et al.

(10) Patent No.: US 10,135,640 B2
(45) Date of Patent: Nov. 20, 2018

(54) SYSTEM AND METHOD FOR REDUCING INTERFERENCE FROM NEIGHBORING WIRELESS DEVICES

(71) Applicant: QUALCOMM Incorporated, San Diego, CA (US)

(72) Inventors: Amichai Sanderovich, Atlit (IL); Ran Hay, Rosh Haaein (IL); Reuven Alpert, Givat Ada (IL); Alecsander Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/393,763

(22) Filed: Dec. 29, 2016

(65) Prior Publication Data
US 2017/0195141 A1  Jul. 6, 2017

Related U.S. Application Data

(60) Provisional application No. 62/273,397, filed on Dec. 30, 2015.

(51) Int. Cl.
*H04L 25/03* (2006.01)
*H04B 7/08* (2006.01)
(Continued)

(52) U.S. Cl.
CPC ..... *H04L 25/03006* (2013.01); *H04B 7/0617* (2013.01); *H04B 7/0695* (2013.01);
(Continued)

(58) Field of Classification Search
CPC ............ H04L 25/03006; H04L 5/0055; H04L 2025/03707; H04B 7/088; H04B 7/086; H04B 7/0695; H04B 7/0617; H04W 16/28
See application file for complete search history.

(56) References Cited

U.S. PATENT DOCUMENTS 9,332,536 B1  5/2016  Zappaterra et al.
2007/0258541 A1  11/2007  Yamaura
(Continued)

FOREIGN PATENT DOCUMENTS

WO  WO-2014074919 A1  5/2014
WO  WO-2014151951 A1  9/2014

OTHER PUBLICATIONS

International Search Report and Written Opinion—PCT/US2016/069394—ISA/EPO—dated Jun. 23, 2017.
(Continued)

*Primary Examiner* — Brandon J Miller
(74) *Attorney, Agent, or Firm* — Loza & Loza, LLP

(57) ABSTRACT

A technique is disclosed for reducing interference in a communication system including a plurality of wireless devices. A first device transmits an RTS-TRN frame including a Request to Send (RTS) portion and a first beam training sequence to determine whether a communication medium is available to communicate with a second device. If the communication medium is available, the second device transmits a CTS-TRN frame including a Clear to Send (CTS) portion and a second beam training sequence. One or more neighboring devices that receive the RTS-TRN frame and/or the CTS-TRN frame configure their respective antennas to generate one or more nulls aimed at the first and second devices when transmitting signals, as long as the first and second devices are communicating based on a duration field in the RTS-TRN frame and/or CTS-TRN frame. This reduces interference at the first and/or second devices.

27 Claims, 15 Drawing Sheets

(51) Int. Cl.
*H04B 7/06* (2006.01)
*H04L 5/00* (2006.01)
*H04W 16/28* (2009.01)

(52) U.S. Cl.
CPC ............. *H04B 7/086* (2013.01); *H04B 7/088* (2013.01); *H04L 5/0055* (2013.01); *H04W 16/28* (2013.01); *H04L 2025/03707* (2013.01)

(56) References Cited

U.S. PATENT DOCUMENTS

| | | |
|---|---|---|
| 2007/0273573 A1 | 11/2007 | Tillotson |
| 2008/0297401 A1 | 12/2008 | Nishida |
| 2010/0054196 A1 | 3/2010 | Hui |
| 2010/0297947 A1 | 11/2010 | Rofougaran |
| 2011/0069688 A1* | 3/2011 | Zhang ................... H04L 1/0083 370/338 |
| 2011/0286403 A1 | 11/2011 | Jain et al. |
| 2011/0287796 A1 | 11/2011 | Jain et al. |
| 2012/0122392 A1* | 5/2012 | Morioka .............. H04B 7/0695 455/25 |
| 2013/0235796 A1* | 9/2013 | Kwon ............... H04W 72/0406 370/328 |
| 2014/0004865 A1 | 1/2014 | Bhargava et al. |
| 2015/0131752 A1* | 5/2015 | Harel ................... H04B 7/0871 375/267 |
| 2015/0373618 A1 | 12/2015 | Deenoo et al. |
| 2017/0078013 A1 | 3/2017 | Sanderovich et al. |
| 2017/0098884 A1 | 4/2017 | Barnickel et al. |
| 2017/0155448 A1* | 6/2017 | Krishnan ............ H04L 25/0224 |
| 2017/0195142 A1 | 7/2017 | Sanderovich et al. |

OTHER PUBLICATIONS

Partial International Search Report and Written Opinion—PCT/US2016/069394—ISA/EPO—dated Mar. 22, 2017.

Spyropoulos I., et al., "A PHY-MAC Cross-Layer Protocol for Ad Hoc Networks with Multiple-Antenna Nodes", Communications, 2009. ICC 09, IEEE International Conference on, IEEE, Piscataway, NJ, USA, Jun. 14, 2009, XP031505632, pp. 1-5.

Co-pending U.S. Appl. No. 15/679,049, filed Aug. 16, 2017.

* cited by examiner

SYSTEM AND METHOD FOR REDUCING INTERFERENCE FROM NEIGHBORING WIRELESS DEVICES

CROSS-REFERENCE TO A RELATED APPLICATION

This application claims the benefit of the filing date of U.S. Provisional Application Ser. No. 62/273,397, filed on Dec. 30, 2015, and entitled, "System and Method for Reducing Interference from Neighboring Wireless Devices," which is incorporated herein by reference. This application is also related to US Provisional Application entitled "System and Method for Reducing Interference from Neighboring Wireless Devices," having a docket number of QCOM-3206U2 (161278U2), and filed concurrently herewith, which is also incorporated herein by reference.

FIELD

This disclosure relates generally to wireless communications, and in particular, to a system and method for reducing interference from neighboring wireless devices.

BACKGROUND

A wireless device having an antenna comprised of multiple radiating elements (e.g., a phased array antenna), may transmit and receive signals to and from remote devices in a directional manner. An advantage of transmitting and receiving signals in a directional manner is that higher antenna gains may be achieved as compared to receiving signals in an omnidirectional manner A further advantage is that signals from unwanted wireless devices ("non-target devices") that are not situated proximate or along the directivity of the antenna may be substantially attenuated to reduce signal interference from such devices.

In addition to configuring an antenna for directionally transmitting and receiving signals to and from a target device, the antenna may be further configured to provide one or more nulls (or regions of high signal attenuation) aimed at particular directions. Such one or more nulls may be used to reduce interference at non-target devices.

Techniques for effectuating such interference reduction using one or more nulls are described herein.

SUMMARY

Certain aspects of the present disclosure provide an apparatus for wireless communications. The apparatus comprises a processing system configured to generate a first frame including a duration field, an address field, and a first beam training sequence, wherein the duration field includes information indicating an estimated duration during which a communication medium will be used for communicating with a device, and wherein the address field includes information identifying at least one of the apparatus or the device; and an interface configured to output the first frame for transmission to the device.

Certain aspects of the present disclosure provide a method for wireless communications. The method comprises generating a first frame including a duration field, an address field, and a first beam training sequence, wherein the duration field includes information indicating an estimated duration during which a communication medium will be used by the apparatus to communicate with a device, and wherein the address field includes information identifying at least one of the apparatus or the device; and outputting the first frame for transmission to the device.

Certain aspects of the present disclosure provide an apparatus for wireless communications. The apparatus comprises means for generating a first frame including a duration field, an address field, and a first beam training sequence, wherein the duration field includes information indicating an estimated duration during which a communication medium will be used by the apparatus to communicate with a device, and wherein the address field includes information identifying at least one of the apparatus or the device; and means for outputting the first frame for transmission to the device.

Certain aspects of the present disclosure provide a computer readable medium having instructions stored thereon for: generating a frame including a duration field, an address field, and a beam training sequence, wherein the duration field includes information indicating an estimated duration during which a communication medium will be used by the apparatus to communicate with a device, and wherein the address field includes information identifying at least one of the apparatus or the device; and outputting the frame for transmission to the device.

Certain aspects of the present disclosure provide a wireless node. The wireless node comprises at least one antenna; a processing system configured to generate a frame including a duration field, an address field, and a beam training sequence, wherein the duration field includes information indicating an estimated duration during which a communication medium will be used by the apparatus to communicate with a device, and wherein the address field includes information identifying at least one of the apparatus or the device; and an interface configured to output the frame for transmission to the device via the at least one antenna.

Certain aspects of the present disclosure provide an apparatus for wireless communications. The apparatus comprises a processing system configured to generate a first frame including a Clear to Send (CTS) portion and a first beam training sequence; and an interface configured to output the first frame for transmission to a device.

Certain aspects of the present disclosure provide a method for wireless communications. The method comprises generating a first frame including a Clear to Send (CTS) portion and a first beam training sequence; and outputting the first frame for transmission to a device.

Certain aspects of the present disclosure provide an apparatus for wireless communications. The apparatus comprises means for generating a first frame including a Clear to Send (CTS) portion and a first beam training sequence; and means for outputting the first frame for transmission to a device.

Certain aspects of the present disclosure provide a computer readable medium having instructions stored thereon for: generating a frame including a Clear to Send (CTS) portion and a beam training sequence; and outputting the frame for transmission to a device.

Certain aspects of the present disclosure provide a wireless node. The wireless node comprises at least one antenna; a processing system configured to generate a frame including a Clear to Send (CTS) portion and a beam training sequence; and an interface configured to output the frame for transmission to a device via the at least one antenna.

Certain aspects of the present disclosure provide an apparatus for wireless communications. The apparatus comprises a processing system configured to: receive a first frame comprising a first beam training sequence from a first device, configure an antenna in a first configuration based on the first beam training sequence, and generate a second frame; and an interface configured to output the second frame for transmission to a second device via the antenna while the antenna is being configured in the first configuration.

Certain aspects of the present disclosure provide a method for wireless communications. The method comprises receiving a first frame comprising a first beam training sequence from a first device; configuring an antenna in a first configuration based on the first beam training sequence; generating a second frame; and outputting the second frame for transmission to a second device via the antenna while the antenna is being configured in the first configuration.

Certain aspects of the present disclosure provide an apparatus for wireless communications. The apparatus comprises means for receiving a first frame comprising a first beam training sequence from a first device; means for configuring an antenna in a first configuration based on the first beam training sequence; means for generating a second frame; and means for outputting the second frame for transmission to a second device via the antenna while the antenna is being configured in the first configuration.

Certain aspects of the present disclosure provide a computer readable medium having instructions stored thereon for: receiving a first frame comprising a beam training sequence from a first device; configuring an antenna in a first configuration based on the beam training sequence; generating a second frame; and outputting the second frame for transmission to a second device via the antenna while the antenna is being configured in the first configuration.

Certain aspects of the present disclosure provide a wireless node. The wireless node comprises at least one antenna; a processing system configured to: receive a first frame comprising a beam training sequence from a first device, configure the at least one antenna in a first configuration based on the beam training sequence, and generate a second frame; and an interface for outputting the second frame for transmission to a second device via the at least one antenna while the at least one antenna is being configured in the first configuration.

Certain aspects of the present disclosure provide an apparatus for wireless communications. The apparatus comprises a processing system configured to: receive a first frame comprising a first Clear to Send (CTS) portion and a first beam training sequence from a first device, configure an antenna in a first configuration based on the first beam training sequence, and generate a second frame; and an interface configured to output the second frame for transmission to a second device via the antenna while the antenna is being configured in the first configuration.

Certain aspects of the present disclosure provide a method for wireless communications. The method comprises receiving a first frame comprising a first Clear to Send (CTS) portion and a first beam training sequence from a first device; configuring an antenna in a first configuration based on the first beam training sequence; generating a second frame; and outputting the second frame for transmission to a second device via the antenna while the antenna is being configured in the first configuration.

Certain aspects of the present disclosure provide an apparatus for wireless communications. The apparatus comprises means for receiving a first frame comprising a first Clear to Send (CTS) portion and a first beam training sequence from a first device; means for configuring an antenna in a first configuration based on the first beam training sequence; means for generating a second frame; and means for outputting the second frame for transmission to a second device via the antenna while the antenna is being configured in the first configuration.

Certain aspects of the present disclosure provide a computer readable medium having instructions stored thereon for: receiving a first frame comprising a Clear to Send (CTS) portion and a beam training sequence from a first device; configuring an antenna in a first configuration based on the beam training sequence; generating a second frame; and outputting the second frame for transmission to a second device via the antenna while the antenna is being configured in the first configuration.

Certain aspects of the present disclosure provide a wireless node. The wireless node comprises at least one antenna; a processing system configured to: receive a frame comprising a Clear to Send (CTS) portion and a beam training sequence from a first device, configure the at least one antenna in a first configuration based on the beam training sequence, and generate a second frame; and an interface for outputting the second frame for transmission to a second device via the at least one antenna while the at least one antenna is configured in the first configuration.

Certain aspects of the present disclosure provide an apparatus for wireless communication. The apparatus comprises a processing system configured to generate a first control frame to be used for determining whether a communication medium is available for providing communications between the apparatus and the device, wherein the first control frame comprises a first beam training sequence; and an interface configured to output the control frame for transmission.

Certain aspects of the present disclosure provide a method for wireless communications. The method comprises generating a first control frame to be used for determining whether a communication medium is available for communicating with a device, wherein the first control frame comprises a first beam training sequence; and outputting the first control frame for transmission to the device.

Certain aspects of the present disclosure provide an apparatus for wireless communications. The apparatus comprises means for generating a first control frame to be used for determining whether a communication medium is available for communicating with a device, wherein the first control frame comprises a first beam training sequence; and means for outputting the first control frame for transmission to the device.

Certain aspects of the present disclosure provide a computer readable medium having instructions stored thereon for generating a first control frame to be used for determining whether a communication medium is available for communicating with a device, wherein the first control frame comprises a first beam training sequence; and outputting the first control frame for transmission to the device.

Certain aspects of the present disclosure provide a wireless node. The wireless node comprises at least one antenna; a processing system configured to generate a first control frame to be used for determining whether a communication medium is available for providing communications between the apparatus and the device, wherein the first control frame comprises a first beam training sequence; and an interface configured to output the first control frame for transmission via the at least one antenna.

Certain aspects of the present disclosure provide an apparatus for wireless communication. The apparatus comprises a processing system configured to receive a first frame to be used for determining whether a communication medium is available for providing communications between a first device and a second device, wherein the first frame comprises a first beam training sequence; configure an antenna in a first configuration based on the first beam training sequence; and generate a second frame. The apparatus further comprises an interface configured to output the second frame for transmission to a third device via the antenna while the antenna is being configured in the first configuration.

Certain aspects of the present disclosure provide a method for wireless communication. The method comprises receiving a first frame to be used for determining whether a communication medium is available for providing communications between a first device and a second device, wherein the first frame comprises a first beam training sequence; configuring an antenna in a first configuration based on the first beam training sequence; generating a second frame; and outputting the second frame for transmission to a third device via the antenna while the antenna is being configured in the first configuration.

Certain aspects of the present disclosure provide an apparatus for wireless communication. The apparatus comprises means for receiving a first frame to be used for determining whether a communication medium is available for providing communications between a first device and a second device, wherein the first frame comprises a first beam training sequence; means for configuring an antenna in a first configuration based on the first beam training sequence; means for generating a second frame; and means for outputting the second frame for transmission to a third device via the antenna while the antenna is being configured in the first configuration.

Certain aspects of the present disclosure provide a computer readable medium having instructions stored thereon for: receiving a first frame to be used for determining whether a communication medium is available for providing communications between a first device and a second device, wherein the first frame comprises a first beam training sequence; configuring an antenna in a first configuration based on the first beam training sequence; generating a second frame; and outputting the second frame for transmission to a third device via the antenna while the antenna is being configured in the first configuration.

Certain aspects of the present disclosure provide a wireless node. The wireless node comprises at least one antenna; a processing system configured to: receive a first frame to be used for determining whether a communication medium is available for providing communications between a first device and a second device, wherein the first frame comprises a first beam training sequence; configure the at least one antenna in a first configuration based on the first beam training sequence; and generate a second frame; and an interface configured to output the second frame for transmission to a third device via the at least one antenna while the at least one antenna is configured in the first configuration.

DETAILED DESCRIPTION

Figure 1:
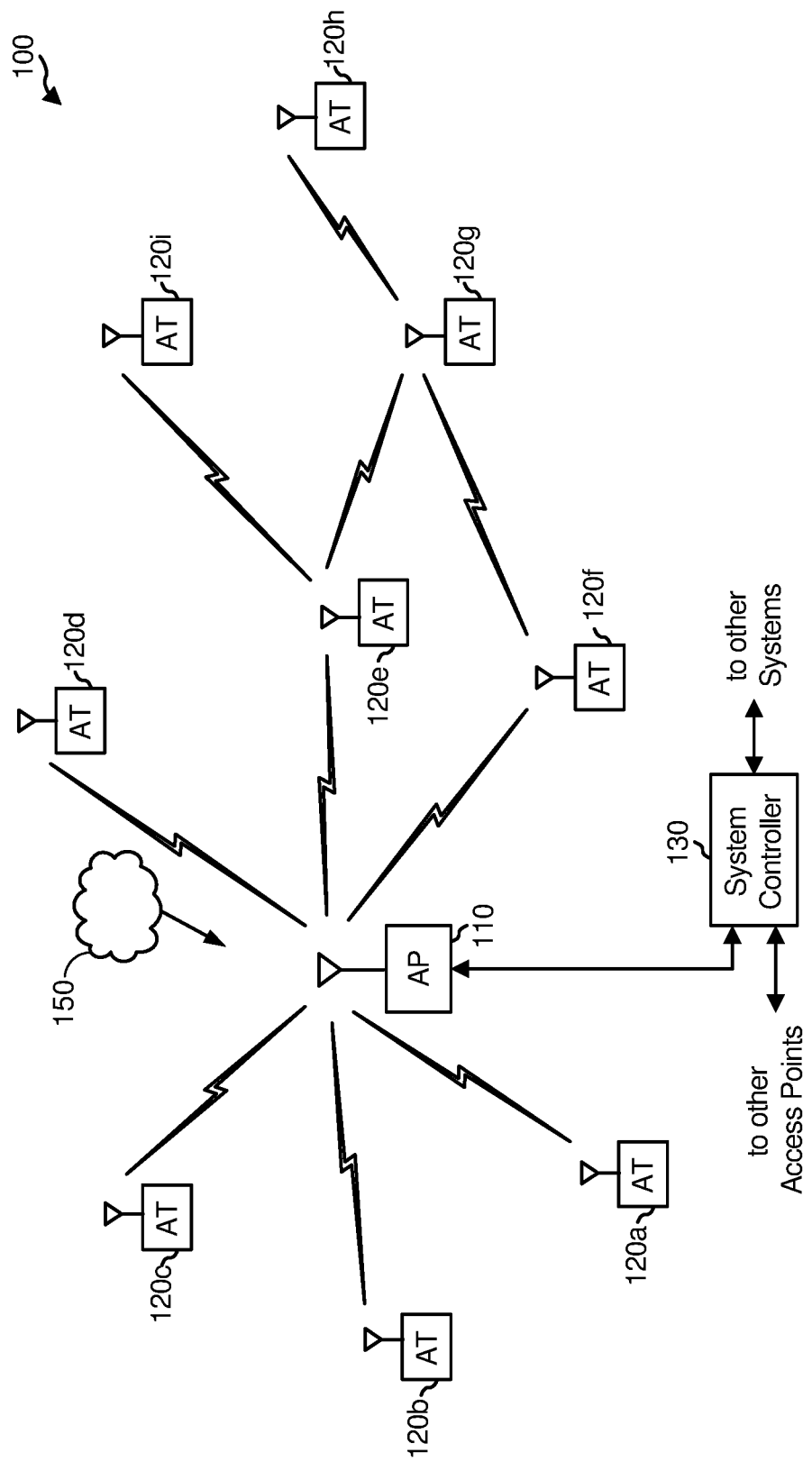
FIG. 1 illustrates a block diagram of an exemplary wireless communication system in accordance with an aspect of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a block diagram of an exemplary wireless communication system 100 with a plurality of wireless nodes, such as access points (ATs) and access terminals (ATs). For simplicity, only one access point 110 is shown. An access point is generally a fixed station that communicates with access terminals and may also be referred to as a base station or some other terminology. An access terminal may be fixed or mobile, and may be referred to as a mobile station, a wireless device or some other terminology. Access point 110 may communicate with one or more access terminals 120a to 120i at any given moment on the downlink and uplink. The downlink (i.e., forward link) is the communication link from the access point to the access terminals, and the uplink (i.e., reverse link) is the communication link from the access terminals to the access point. An access terminal may also communicate peer-to-peer with another access terminal. A system controller 130 couples to and provides coordination and control for the access points. The access point 110 may communicate with other devices coupled to a backbone network 150.

Figure 2:
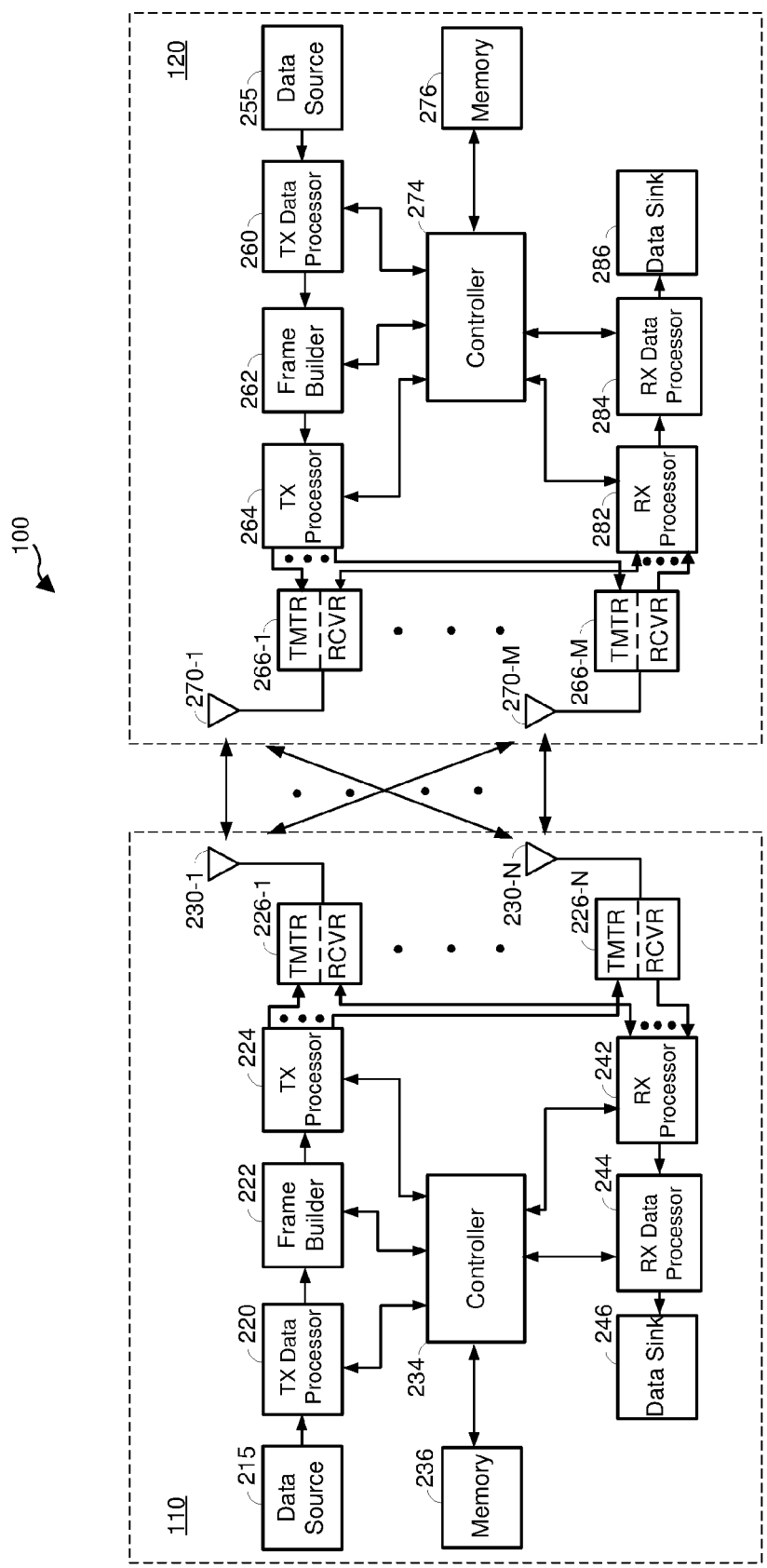
FIG. 2 illustrates a block diagram of an exemplary access point and access terminal in accordance with another aspect of the present disclosure.

FIG. 2 illustrates a block diagram of an access point 110 (generally, a first wireless node) and an access terminal 120 (generally, a second wireless node) in the wireless communication system 100. The access point 110 is a transmitting entity for the downlink and a receiving entity for the uplink. The access terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel.

It shall be understood that the access point 110 may alternatively be an access terminal, and the access terminal 120 may alternatively be an access point.

For transmitting data, the access point 110 comprises a transmit data processor 220, a frame builder 222, a transmit processor 224, a plurality of transceivers 226-1 to 226-N, and a plurality of antennas 230-1 to 230-N. The access point 110 also comprises a controller 234 for controlling operations of the access point 110.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 220 specifying which modulation and coding scheme (MCS) to use (e.g., based on channel conditions of the downlink), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

The frame builder 222 constructs a frame (also referred to as a packet), and inserts the data symbols into a data payload of the frame. The frame may include a preamble, a header, and the data payload. The preamble may include a short training field (STF) sequence and a channel estimation (CE) sequence to assist the access terminal 120 in receiving the frame. The header may include information related to the data in the payload such as the length of the data and the MCS used to encode and modulate the data. This information allows the access terminal 120 to demodulate and decode the data. The data in the payload may be divided among a plurality of blocks, wherein each block may include a portion of the data and a guard interval (GI) to assist the receiver with phase tracking. The frame builder 222 outputs the frame to the transmit processor 224.

The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode. The transmit processor 224 may apply a spectrum mask to the frame so that the frequency constituent of the downlink signal meets certain spectral requirements.

In certain aspects, the transmit processor 224 may support multiple-input-multiple-output (MIMO) transmission. In these aspects, the access point 110 may include multiple antennas 230-1 to 230-N and multiple transceivers 226-1 to 226-N (e.g., one for each antenna). The transmit processor 224 may perform spatial processing on the incoming frames and provide a plurality of transmit frame streams for the plurality of antennas. The transceivers 226-1 to 226-N receive and processes (e.g., converts to analog, amplifies, filters, and frequency upconverts) the respective transmit frame streams to generate transmit signals for transmission via the antennas 230-1 to 230-N, respectively.

For transmitting data, the access terminal 120 comprises a transmit data processor 260, a frame builder 262, a transmit processor 264, a plurality of transceivers 266-1 to 266-M, and a plurality of antennas 270-1 to 270-M (e.g., one antenna per transceiver). The access terminal 120 may transmit data to the access point 110 on the uplink, and/or transmit data to another access terminal (e.g., for peer-to-peer communication). The access terminal 120 also comprises a controller 274 for controlling operations of the access terminal 120.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. The frame may include a preamble, a header, and the data payload. The preamble may include an STF sequence and a CE sequence to assist the access point 110 and/or other access terminal in receiving the frame. The header may include information related to the data in the payload such as the length of the data and the MCS used to encode and modulate the data. The data in the payload may be divided among a plurality of blocks where each block may include a portion of the data and a guard interval (GI) assisting the access point and/or other access terminal with phase tracking. The frame builder 262 outputs the frame to the transmit processor 264.

The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode. The transmit processor 264 may apply a spectrum mask to the frame so that the frequency constituent of the uplink signal meets certain spectral requirements.

The transceivers 266-1 to 266-M receive and process (e.g., converts to analog, amplifies, filters, and frequency upconverts) the output of the transmit processor 264 for transmission via the one or more antennas 270-1 to 270-M. For example, the transceiver 266 may upconvert the output of the transmit processor 264 to a transmit signal having a frequency in the 60 GHz range.

In certain aspects, the transmit processor 264 may support multiple-input-multiple-output (MIMO) transmission. In these aspects, the access terminal 120 may include multiple antennas 270-1 to 270-M and multiple transceivers 266-1 to 266-M (e.g., one for each antenna). The transmit processor 264 may perform spatial processing on the incoming frame and provide a plurality of transmit frame streams for the plurality of antennas 270-1 to 270-M. The transceivers 266-1 to 266-M receive and process (e.g., converts to analog, amplifies, filters, and frequency upconverts) the respective transmit frame streams to generate transmit signals for transmission via the antennas 270-1 to 270-M.

For receiving data, the access point 110 comprises a receive processor 242, and a receive data processor 244. In operation, the transceivers 226-1 to 226-N receive a signal (e.g., from the access terminal 120), and spatially process (e.g., frequency downconverts, amplifies, filters and converts to digital) the received signal.

The receive processor 242 receives the outputs of the transceivers 226-1 to 226-N, and processes the outputs to recover data symbols. For example, the access point 110 may receive data (e.g., from the access terminal 120) in a frame. In this example, the receive processor 242 may detect the start of the frame using the STF sequence in the preamble of the frame. The receiver processor 242 may also use the STF for automatic gain control (AGC) adjustment. The receive processor 242 may also perform channel estimation (e.g., using the CE sequence in the preamble of the frame) and perform channel equalization on the received signal based on the channel estimation.

Further, the receiver processor 242 may estimate phase noise using the guard intervals (GIs) in the payload, and reduce the phase noise in the received signal based on the estimated phase noise. The phase noise may be due to noise from a local oscillator in the access terminal 120 and/or noise from a local oscillator in the access point 110 used for frequency conversion. The phase noise may also include noise from the channel. The receive processor 242 may also recover information (e.g., MCS scheme) from the header of the frame, and send the information to the controller 234. After performing channel equalization and/or phase noise reduction, the receive processor 242 may recover data symbols from the frame, and output the recovered data symbols to the receive data processor 244 for further processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the access terminal 120 may transmit data using an OFDM transmission mode or a SC transmission mode. In this case, the receive processor 242 may process the receive signal according to the selected transmission mode. Also, as discussed above, the transmit processor 264 may support multiple-input-multiple-output (MIMO) transmission. In this case, the access point 110 includes multiple antennas 230-1 to 230-N and multiple transceivers 226-1 to 226-N (e.g., one for each antenna). Each transceiver receives and processes (e.g., frequency downconverts, amplifies, filters, and converts to digital) the signal from the respective antenna. The receive processor 242 may perform spatial processing on the outputs of the transceivers 226-1 to 226-N to recover the data symbols.

For receiving data, the access terminal 120 comprises a receive processor 282, and a receive data processor 284. In operation, the transceivers 266-1 to 266-M receive a signal (e.g., from the access point 110 or another access terminal) via the respective antennas 270-1 to 270-M, and process (e.g., frequency downconverts, amplifies, filters and converts to digital) the received signal.

The receive processor 282 receives the outputs of the transceivers 266-1 to 266-M, and processes the outputs to recover data symbols. For example, the access terminal 120 may receive data (e.g., from the access point 110 or another access terminal) in a frame, as discussed above. In this example, the receive processor 282 may detect the start of the frame using the STF sequence in the preamble of the frame. The receive processor 282 may also perform channel estimation (e.g., using the CE sequence in the preamble of the frame) and perform channel equalization on the received signal based on the channel estimation.

Further, the receiver processor 282 may estimate phase noise using the guard intervals (GIs) in the payload, and reduce the phase noise in the received signal based on the estimated phase noise. The receive processor 282 may also recover information (e.g., MCS scheme) from the header of the frame, and send the information to the controller 274. After performing channel equalization and/or phase noise reduction, the receive processor 282 may recover data symbols from the frame, and output the recovered data symbols to the receive data processor 284 for further processing.

The receive data processor 284 receives the data symbols from the receive processor 282 and an indication of the corresponding MSC scheme from the controller 274. The receiver data processor 284 demodulates and decodes the data symbols to recover the data according to the indicated MSC scheme, and outputs the recovered data (e.g., data bits) to a data sink 286 for storage and/or further processing.

As discussed above, the access point 110 or another access terminal may transmit data using an OFDM transmission mode or a SC transmission mode. In this case, the receive processor 282 may process the receive signal according to the selected transmission mode. Also, as discussed above, the transmit processor 224 may support multiple-input-multiple-output (MIMO) transmission. In this case, the access terminal 120 may include multiple antennas and multiple transceivers (e.g., one for each antenna). Each transceiver receives and processes (e.g., frequency downconverts, amplifies, filters, and converts to digital) the signal from the respective antenna. The receive processor 282 may perform spatial processing on the outputs of the transceivers to recover the data symbols.

As shown in FIG. 2, the access point 110 also comprises a memory 236 coupled to the controller 234. The memory 236 may store instructions that, when executed by the controller 234, cause the controller 234 to perform one or more of the operations described herein. Similarly, the access terminal 120 also comprises a memory 276 coupled to the controller 274. The memory 276 may store instructions that, when executed by the controller 274, cause the controller 274 to perform the one or more of the operations described herein.

Figure 3A:
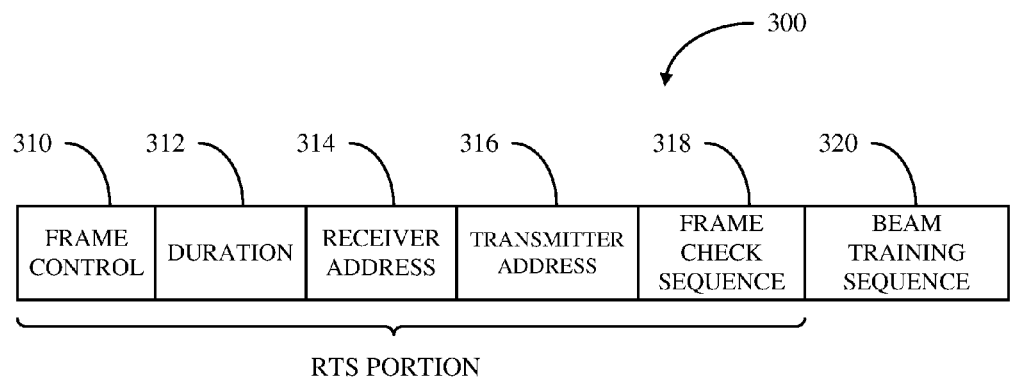
FIGS. 3A-3C illustrate diagrams of exemplary modified Request to Send (RTS) frame, modified Clear to Send (CTS) frame, and an ACK frame, respectively, in accordance with another aspect of the present disclosure.

FIG. 3A illustrates a diagram of an exemplary modified Request to Send (RTS) frame 300 in accordance with another aspect of the present disclosure. A wireless device (referred to herein as an "originating device") may use an RTS frame to determine whether the communication medium is available to send one or more data frames to a "destination device." Typically, an RTS frame is sent when the size of the one or more data frames to be transmitted to the destination device exceeds a specified threshold. In response to receiving the RTS frame, the destination device sends a Clear to Send (CTS) frame back to the originating device if the communication medium is available. In response to receiving the CTS frame, the originating device sends the one or more data frames to the destination device. In response to successfully receiving the one or more data frames, the destination device sends one or more Acknowledgement ("ACK") frames to the originating device.

With regard to the frame details, the frame 300 includes an RTS portion including a frame control field 310, a duration field 312, a receiver address field 314, a transmitter address field 316, and a frame check sequence field 318. For improved communication and interference reduction purposes as discussed in more detail herein, the frame 300 further includes a beam training sequence field 320 for configuring respective antennas of the destination device and one or more neighboring devices.

The RTS portion of the frame 300 may be configured as a standard RTS frame specified in the IEEE a protocols. In this regard, the frame control field 310 includes the following subfields: a "protocol" subfield for specifying a version associated with the RTS frame portion; a "type" subfield for indicating a type of the frame (e.g., type=01 for a control frame); a "subtype" subfield for indicating a subtype of the frame (e.g., subtype=1011 indicates an RTS frame); and "ToDS" and "FromDS" subfields to indicate whether a distribution system sends and receives the control frames (e.g., ToDS=0 and FromDS=0 for an RTS frame).

Additionally, the frame control field 310 further includes the following subfields: a "More Fragments" subfield to indicate whether the frame is fragmented (e.g., More Fragments=0 for an RTS frame as it is not fragmented); a "Retry" subfield to indicate whether the frame should be retransmitted if not received (e.g., Retry=0 for an RTS frame as it is not retransmitted); a "Power Management" subfield to indicate a power management state of the sender after conclusion of the current frame exchange; a "More Data" subfield used in management and data frames (e.g., More Data=0 for an RTS frame); a "Protected Frame" subfield to indicate whether the frame is encrypted (e.g., Protected Frame=0 as an RTS frame is not encrypted); and an "Order" subfield to indicate an order of associated frames (e.g., Order=0 for an RTS frame as the frame cannot be transmitted out of order).

The duration field 312 of the RTS portion of the frame 300 provides an indication of an estimated duration for which the originating device will be communicating with the destination device. Or, in other words, the duration field 312 specifies an estimate of the duration in which the communication medium will be used to effectuate the communication between the originating device and the destination device. The duration may include the following cumulative durations: (1) duration of a Short Interframe Space (SIFS) between the end of the transmission of the RTS frame and the beginning of the transmission of the CTS frame; (2) duration of the CTS frame; (3) duration of another SIFS between the end of the transmission of the CTS frame and the beginning of the transmission of the one or more data frames; (4) duration of the one or more data frames; (5) duration of another SIFS between the end of the transmission of the one or more data frames and the beginning of the transmission of the ACK frame; and (6) duration of the ACK frame. As discussed in more detail further herein, one or more neighboring devices may use the duration to maintain their respective antennas configured to reduce transmission interference at the originating device and/or the destination device while these devices are communicating.

The receiving address field 314 of the RTS portion of the frame 300 indicates the address (e.g., media access control (MAC) address, association identifier (AID), basic service set identifier (BSSID), group ID, etc.) of the destination device. In a multi-user (MU) application, the receiver address field 314 indicates the addresses of a set of destination devices. As discussed in more detail, devices that receive the RTS frame 300 may perform different operations depending on whether the device is the destination device or a non-destination neighboring device. The transmitter address field 316 of the RTS portion of the frame 300 indicates the address (e.g., MAC address, AID, BSSID, group ID, etc.) of the originating device. The frame check sequence field 318 of the RTS portion of the frame 300 includes a value that allows receiving devices to determine the validity of the information transmitted via the RTS portion of the frame 300.

As previously discussed, the modified frame 300 includes a beam training sequence field 320 that includes a beam training sequence to allow receiving devices to configure their respective antennas to improve the communication performed by the originating device and reduce interference at the originating device. The beam training sequence in field 320 may comply with the training (TRN) sequence in accordance with IEEE 802.11ad or 802.11ay. For instance, as discussed in more detail further herein, the destination device may use the beam training sequence to configure its antenna for directionally transmitting and receiving to and from the originating device. With regard to one or more neighboring devices, such one or more neighboring devices may use the beam training sequence to configure their respective antennas to generate antenna radiation patterns with nulls aimed substantially at the originating device (or such that an estimated interference at the originating device is at or below a defined threshold (e.g., to achieve a desired bit error rate (BER), signal-to-noise ratio (SNR), signal-to-interference ratio (SINR), and/or other one or more communication attributes)) to reduce transmission interference at the originating device. The beam training sequence in the beam training sequence field 320 may be based on a Golay sequence.

Figure 3B:
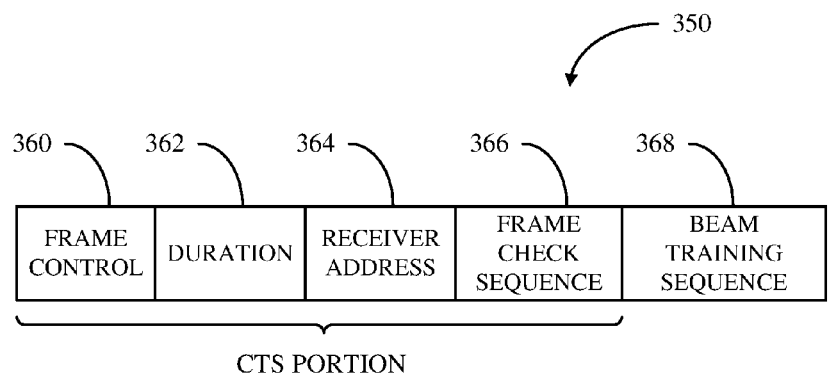

FIG. 3B illustrates a diagram of an exemplary modified Clear to Send (CTS) frame 350 in accordance with another aspect of the present disclosure. As previously discussed, a destination device transmits the CTS frame 350 to an originating device if the communication medium is available for transmission of one or more data frames from the originating device to the destination device.

In particular, the modified CTS frame 350 includes a CTS portion including a frame control field 360, a duration field 362, a receiver address field 364, and a frame check sequence field 366. For improved communication and interference reduction purposes as discussed in more detail herein, the frame 350 further includes a beam training sequence field 368 for configuring respective antennas of the originating device and one or more neighboring devices.

The frame control field 360 of the CTS portion of the frame 350 includes essentially the same subfields as that of the RTS portion of the frame 300, as previously discussed. The subfields of the frame control field 360 include the same values as the subfields of the frame control field 310 of the RTS portion of frame 300, which the exception that the subtype subfield of the frame control field 360 is set to 1100 to indicate a CTS frame (instead of 1011 which indicates an RTS frame).

The duration field 362 of the CTS portion of the frame 350 provides an indication of a remaining estimated duration for which the originating device will be communicating with the destination device. Or, in other words, the duration field 362 specifies an estimate of the remaining duration in which the communication medium will be used to effectuate the communication between the originating device and the destination device. In particular, the duration field 362 includes the duration indicated in the duration field 312 of the RTS portion of frame 300, except that it does not include the cumulative durations of the CTS frame and the SIFS immediately before the CTS frame. More specifically, the duration may include the following cumulative durations: (1) duration of a SIFS between the end of the transmission of the CTS frame and the beginning of the transmission of the one or more data frames; (2) duration of the one or more data frames; (3) duration of another SIFS between the end of the transmission of the one or more data frames and the beginning of the transmission of the ACK frame; and (4) duration of the ACK frame.

As discussed in more detail further herein, one or more neighboring devices may use the duration indicated in the duration field 362 of the CTS portion of frame 350 to configure their respective antennas to reduce transmission interference at the originating device and/or the destination device while these devices are communicating. For instance, a neighboring device that has received both the modified RTS frame 300 and the modified CTS frame 350 may configure its antenna to produce an antenna radiation pattern with respective nulls aimed substantially at the originating device and the destination device while the originating device and destination device are communicating for the duration specified in the duration fields 312 and 362. In another example, a neighboring device that has received only the modified CTS frame 350 may configure its antenna to produce an antenna radiation pattern with a null aimed substantially at the destination device while the originating device and destination device are communicating for the duration specified in the duration field 362. In yet another example, a neighboring device that has received only the modified RTS frame 300 may configure its antenna to produce an antenna radiation pattern with a null aimed substantially at the originating device while the originating device and destination device are communicating for the duration specified in the duration field 312.

The receiving address field 364 of the CTS portion of the frame 350 indicates the address (e.g., MAC address, AID, BSSID, group ID, etc.) of the originating device. Although not shown, the CTS portion may also include a transmitter address field including the address of the device transmitting the frame 350. The frame check sequence field 366 of the CTS portion of the frame 350 includes a value that allows receiving devices to determine the validity of the information transmitted via the CTS portion of the frame 350.

As previously discussed, the modified frame 350 includes a beam training sequence field 368 that includes a beam training sequence to allow receiving devices to configure their respective antennas to improve the communication by the destination device and to reduce interference at the destination device. The beam training sequence in field 368 may comply with the training (TRN) sequence in accordance with IEEE 802.11ad or 802.11ay. For instance, as discussed in more detail further herein, the originating device may use the beam training sequence field 368 to configure its antenna for directionally transmitting to the destination device. With regard to one or more neighboring devices, such one or more neighboring devices may use the beam training sequence field to configure their respective antennas to generate an antenna radiation pattern with nulls aimed at the destination device (or such that an estimated interference at the destination device is at or below a defined threshold (e.g., to achieve a desired BER, SNR, SINR, and/or other one or more communication attributes)) to reduce transmission interference at the destination device. The sequence in the beam training sequence field 368 may be based on a Golay sequence.

Figure 3C:
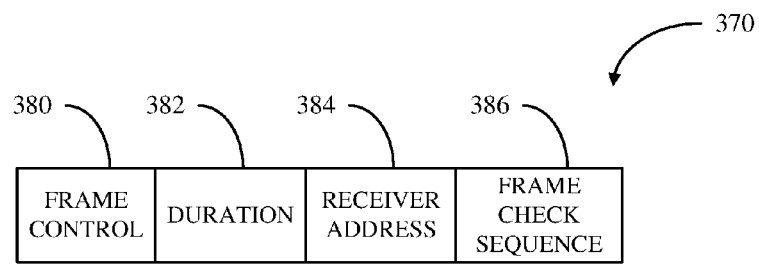

FIG. 3C illustrates a diagram of an exemplary ACK frame 370 in accordance with another aspect of the present disclosure. The ACK frame 370 may be configured as a standard ACK frame per IEEE 802.11 protocols. As previously discussed, a destination device transmits the ACK frame 370 to an originating device in response to successfully receiving the one or more data frames from the originating device.

In particular, the ACK frame 370 includes a frame control field 380, a duration field 382, a receiver address field 384, and a frame check sequence field 386. The frame control field 380 of the ACK frame 370 includes essentially the same subfields as that of the RTS and CTS portions of frames 300 and 350, respectively. The subfields of the frame control field 380 include the same values as the subfields of the frame control fields 310 and 360 of respective frames 300 and 350, which the exception that the subtype subfield of the frame control field 380 is set to 1101 to indicate an ACK frame.

The duration field 382 of the ACK frame 370 provides an indication of a remaining estimated duration for which the originating device will be communicating with the destination device. If, for example, the last data frame from the originating device indicates a 0 in the More Fragments subfield of its frame control field, then there are no further data transmissions from the originating device to the destination device. Accordingly, in such case, the duration field 382 indicates a 0 as there are no further communication between the originating device and the destination device once the ACK frame is transmitted. If, on the other hand, the last data frame from the originating device indicates a 1 in the More Fragments subfield of its frame control field, then there are more subsequent data transmissions from the originating device to the destination device. Accordingly, in such case, the duration field 382 indicates an estimate of the remaining duration for which the originating device and the destination device will be communicating after the transmission of the ACK frame. As discussed below, such estimated duration may be used by neighboring devices to configure their respective antennas to generate antenna radiation patterns with nulls aimed substantially at at least one of the originating device or the destination device.

The receiving address field 384 of the ACK frame 370 indicates the address (e.g., MAC address) of the originating device. The frame check sequence field 386 of the ACK frame 370 includes a value that allows receiving devices to determine the validity of the information transmitted via the ACK frame 370.

Figure 3D:
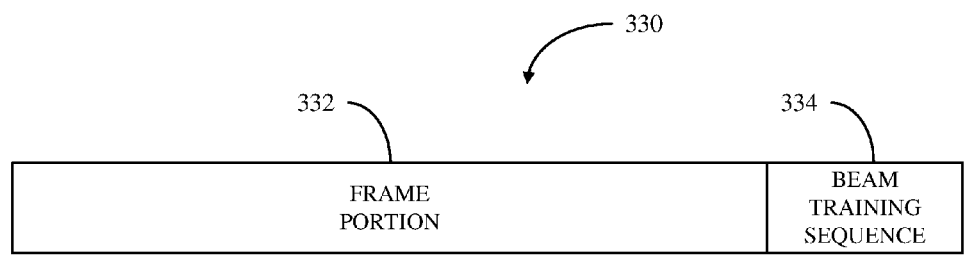
FIG. 3D illustrates a diagram of an exemplary frame in accordance with another aspect of the disclosure.

FIG. 3D illustrates a diagram of an exemplary frame 330 in accordance with another aspect of the disclosure. The modified RTS frame 300 and modified CTS frame 350 each included a beam training sequence to allow one or more neighboring devices to configure their respective antennas to generate a transmission radiation pattern with nulls aimed substantially at a device transmitting the modified RTS frame 300 or the modified CTS frame 350. With nulls aimed substantially at the device, the interference at the device due to transmission by the one or more neighboring devices may be reduced.

This technique of reducing interference at devices transmitting modified RTS frame 300 or modified CTS frame 350 need not be limited to frames that include RTS or CTS information. In this regard, the frame 330 includes a frame portion 332 and a beam training sequence 334. Similarly, one or more neighboring devices receiving the frame 330 may use the beam training sequence 334 to configure its antenna to generate a transmission radiation pattern with nulls aimed substantially at the device transmitting the frame 330 so as to prevent interference at that device.

Figure 3E:
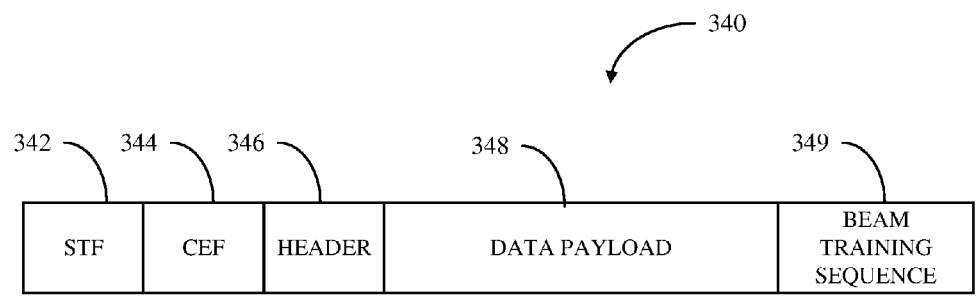
FIG. 3E illustrates a diagram of another exemplary frame in accordance with another aspect of the disclosure.

FIG. 3E illustrates a diagram of another exemplary frame 340 in accordance with another aspect of the disclosure. The frame 340 may be an exemplary data frame that includes a beam training sequence for reducing interference at a device transmitting the frame 340 by one or more neighboring devices configuring their antenna to generate transmission radiation patterns with nulls aimed at substantially the device transmitting the frame 340.

In particular, the frame 340 may include a short training field (STF) sequence 342, a channel estimation field (CEF) sequence 344, a header 346, a data payload 348, and a beam training sequence 349. As discussed, one or more neighboring devices receiving the frame 340 may use the beam training sequence 349 to configure its antenna to generate a transmission radiation pattern with nulls aimed substantially at the device transmitting the frame 340 so as to prevent interference at that device.

Any of the aforementioned frames 300, 350, 370, 330, and 340 may be transmitted in a millimeter wave spectrum (e.g., around 60 GHz), via a single carrier, and/or in accordance with IEEE 802.11ad, 802.11ay, or 802.11aj protocol.

The following description with reference to FIGS. 4A-4F provides examples of how the frames 300, 350, and 370 are used to improve communication between an originating device and a destination device, such as by at least reducing interference at the originating device and destination device from transmission by neighboring devices. It shall be understood that the discussion below with reference to FIGS. 4A-4F is also applicable to frames 330 and 340.

Figure 4A:
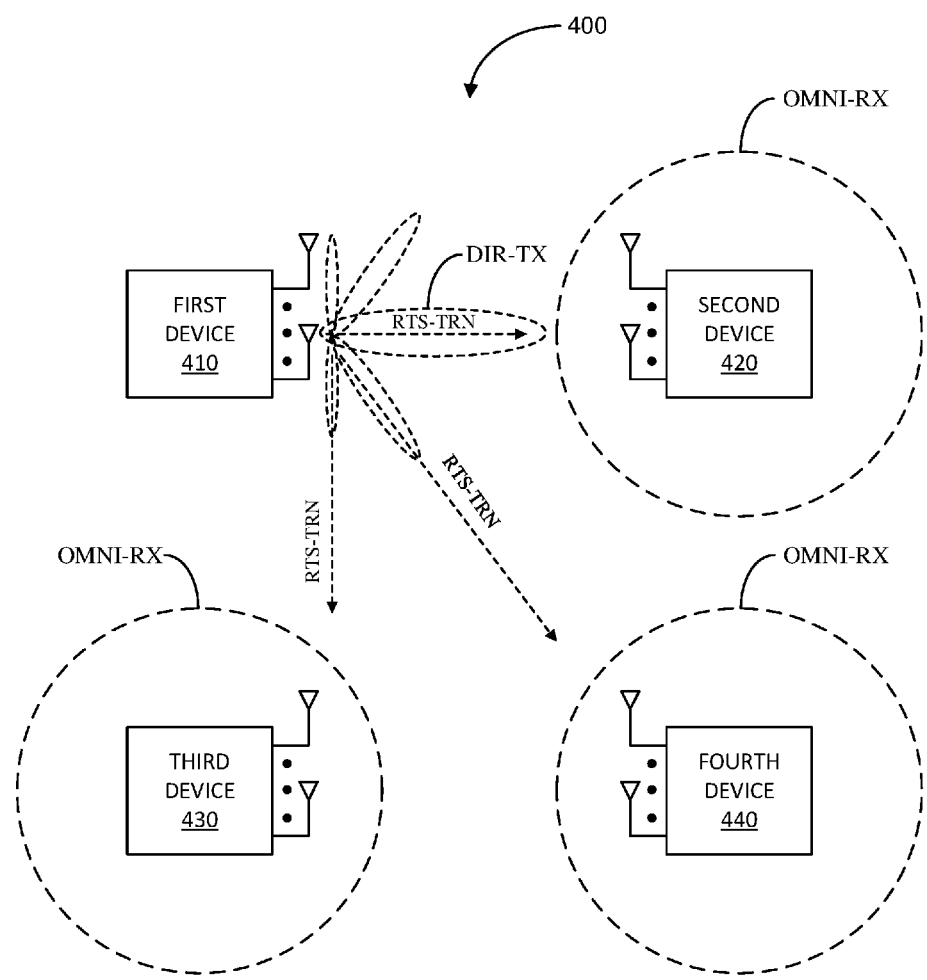
FIG. 4A illustrates a block diagram of an exemplary communication system in a first configuration in accordance with another aspect of the present disclosure.

FIG. 4A illustrates a block diagram of an exemplary communication system 400 in a first configuration in accordance with another aspect of the present disclosure. As illustrated, the communication system 400 includes a plurality of wireless devices, such as a first device 410, a second device 420, a third device 430, and a fourth device 440. In this example, the first device 410 is an example of an originating device that will be transmitting one or more data frames to a destination device, which, in this example, is the second device 420. Also, in this example, the third device 430 is an example of a neighboring device to the first device 410 and the second device 420, wherein the third device 430 serves as another originating device for transmitting one or more data frames to another destination device, which, in this example, is the fourth device 440. Additionally, the fourth device 440 is a neighboring device to the first device 410.

Each of the first device 410, the second device 420, the third device 430, and the fourth device 440 includes an antenna with multiple antenna elements, allowing each of them to transmit and receive in an omnidirectional manner and in a directional manner. In the first configuration, the first device 410 has configured its antenna for directional transmission (DIR-TX) aimed approximately at the second device 420, and the second device 420, the third device 430, and the fourth device 440 have configured their respective antennas for omnidirectional reception (OMNI-RX).

In the first configuration, the first device 410, operating as an originating device, transmits a modified RTS ("RTS-TRN") frame 300 with the receiver address field 314 indicating the address of the second device 420. In this example, the second device 420, the third device 430, and the fourth device 440 are sufficiently close to the first device 410 to receive the RTS-TRN frame 300. Based the beam training sequence 320 in the RTS-TRN frame 300, the third 430 and/or fourth device 440 may estimate an angle of arrival of the received RTS-TRN frame.

Figure 4B:
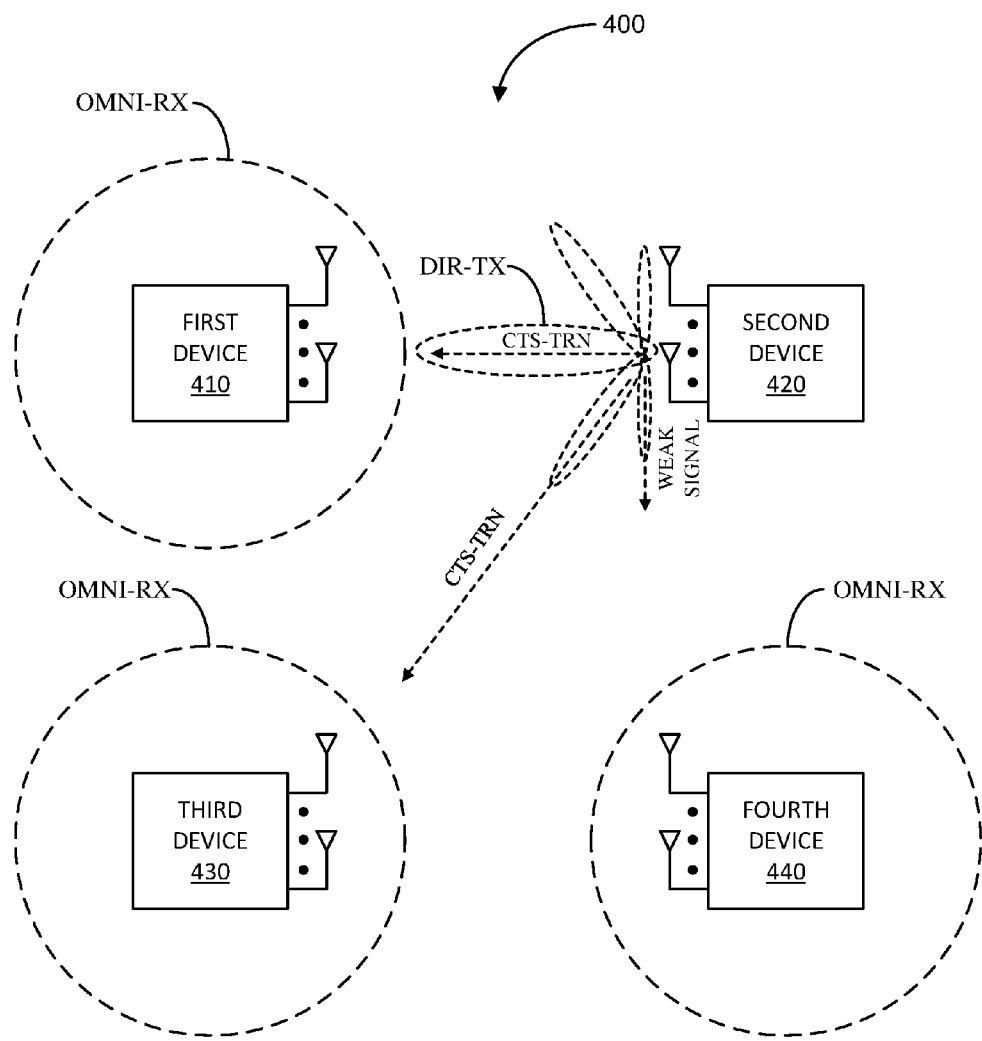
FIG. 4B illustrates a block diagram of an exemplary communication system in a second configuration in accordance with another aspect of the present disclosure.

FIG. 4B illustrates a block diagram of the exemplary communication system 400 in a second configuration in accordance with another aspect of the present disclosure. In the second configuration, the second device 420 determines that it is the destination device based on the address indicated in the receiver address field 314 of the RTS-TRN frame 300. In response to determining it is the destination device, the second device 420 may optionally use the beam training sequence in the beam training sequence field 320 of the received RTS-TRN 300 to configure its antenna for directional transmission aimed at the first device 410. That is, the antenna of the second device 420 may be configured to generate an antenna radiation pattern with a primary lobe (e.g., highest gain lobe) aimed at the first device 410, and non-primary lobes (e.g., lobes having distinct gains lower than that of the primary lobe) aimed in other directions (e.g., not aimed at the first device 410). In this example, one of the non-primary lobes is aimed at the third device 430.

Similarly, the third device 430 and the fourth device 440 determine that they are not the destination device based on the address indicated in the receiver address field 314 of the RTS-TRN frame 300. In response to determining that they are not the destination device, the third device 430 and the fourth device 440 use the beam training sequence in the beam training sequence field 320 of the RTS-TRN frame 300 to determine their respective directions to the first device 410. Additionally, the third device 430 and the fourth device 440 store the duration indicated in the duration field 312 of the RTS-TRN frame 300. As discussed in further detail herein, when the third device 430 and the fourth device 440 subsequently transmit a signal while the first device 410 is communicating with the second device 420 based on the duration indicated in the duration field 312, the third device 430 and the fourth device 440 configure their respective antenna to generate respective antenna radiation patterns with respective nulls aimed substantially at the first device 410. When the third device 430 and the fourth device 440 determine that the first device 410 and the second device 420 are no longer communicating based on the duration, the third device 430 and the fourth device 440 may reconfigure their respective antennas to generate respective antenna radiation patterns without nulls aimed at the first device 410.

In the second configuration, the second device 420 transmits a modified CTS ("CTS-TRN") frame 350 with its antenna optionally configured for directional transmission aimed substantially at the first device 410. In this example, the first device 410 receives the CTS-TRN frame 350. Also, in accordance with this example, the third device 430 receives the CTS-TRN frame 350, while the fourth device 440 does not receive the CTS-TRN frame 350. The reason that the third device 430 receives the CTS frame 350 may be that one of the non-primary lobes of the antenna radiation pattern associated with the second device 420 is aimed at the third device 430 and the power of the signal carrying the CTS-TRN frame 350 is greater than the receiver sensitivity of the third device 430. The reason that the fourth device 440 does not receive the CTS frame 350 may be that one of the non-primary lobes associated with the second device 420 is not aimed at the fourth device 440, and the power of the signal carrying the CTS-TRN frame 350 at the fourth device 440 is below the receive sensitivity of the fourth device 440. Based the beam training sequence 368 in the CTS-TRN frame 350, the third 430 may estimate an angle of arrival of the received CTS-TRN frame.

Figure 4C:
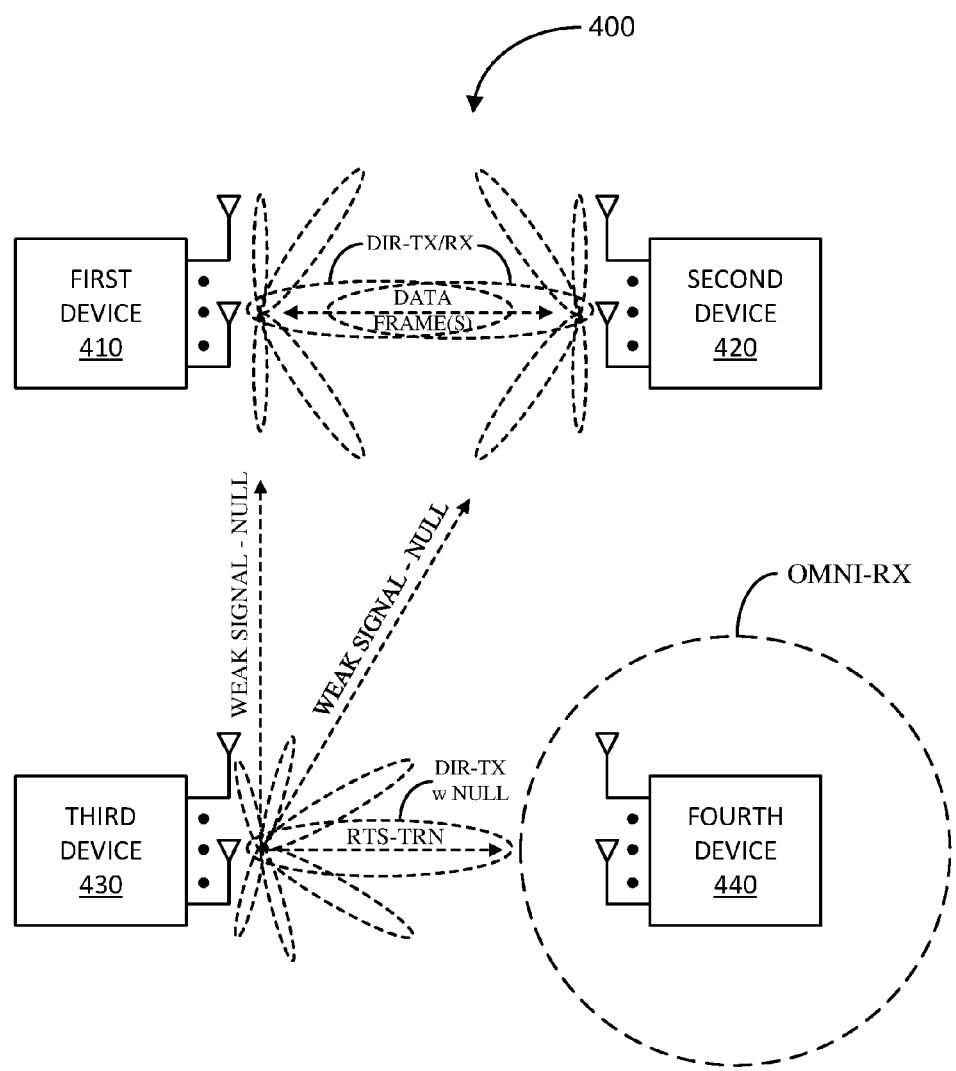
FIG. 4C illustrates a block diagram of an exemplary communication system in a third configuration in accordance with another aspect of the present disclosure.

FIG. 4C illustrates a block diagram of the exemplary communication system 400 in a third configuration in accordance with another aspect of the present disclosure. In the third configuration, the first device 410 determines that it is the intended receiving device of the CTS-TRN frame 350 based on the address indicated in the receiver address field 364 of the CTS-TRN frame 350. In response to determining it is the intended receiving device of the CTS-TRN frame 350, the first device 410 may optionally use the beam training sequence in the beam training sequence field 368 of the received CTS-TRN 350 to configure its antenna for directional transmission aimed substantially at the second device 420. That is, the antenna of the first device 410 is configured to generate an antenna radiation pattern with a primary lobe (e.g., highest gain lobe) aimed substantially at the second device 420 and non-primary lobes aimed in other directions.

Also, in the third configuration, the second device 420 may have optionally configure its antenna for directional reception (e.g., primary antenna radiation lobe) aimed at the first device 410, as the second device 420 already knows the direction to the first device 410 based on the beam training sequence in the beam training sequence field 320 of the RTS-TRN frame 300 it has previously received. Thus, while the antenna of the first device 410 is configured for directional transmission to the second device 420, and the antenna of the second device 420 is configured for directional reception from the first device 410, the first device 410 transmits one or more data frames to the second device 420.

Further, in accordance with the third configuration, the third device 430 determines that it is not the intended receiving device of the CTS-TRN frame 350 based on the address indicated in the receiver address field 364 of the CTS-TRN frame 350. In response to determining it is not the intended receiving device of the CTS-TRN frame 350, the third device 430 uses the beam training sequence in the beam training sequence field 368 of the received CTS-TRN 350 and the sequence in the beam training sequence field 320 of the RTS-TRN frame 300 previously received, to configure its antenna for generating an antenna radiation pattern with nulls aimed substantially at the second device 420 and the first device 410, respectively. The nulls may be based on the estimated angle of arrivals of the previously-received RTS-TRN frame 300 and CTS-TRN frame 350. In general, the third device 430 generates an antenna radiation pattern with desired signal powers, rejections, or gains aimed at the first device 410 and the second device 420 (e.g., to achieve an estimated interference at such devices 410 and 420 to be at or below a defined threshold (e.g., to achieve a desired BER, SNR, SINR, and/or other one or more communication attributes)), respectively.

More specifically, the third device 430 may configure its antenna transmission radiation pattern by estimating antenna gains at the directions towards the first and second devices 410 and 420, estimating the antenna reciprocity differences (e.g., transmit antenna gain–receive antenna gain) between the third device 430 and the first and second devices 410 and 420, and calculating the above over one or more sectors to determine the corresponding estimated interference at the first and second devices 410 and 420, respectively.

With such antenna configuration, the third device 430 transmits an RTS-TRN frame 300 intended for the fourth device 440, which the fourth device 440 receives. The third device 430 maintains an antenna configuration with nulls aimed at the first device 410 and second device 420 as long as these devices are communicating based on the duration indicated in the duration fields 312 and 362 of the RTS-TRN frame 300 and CTS-TRN frame 350, respectively. As the antenna of the third device 430 is configured to produce nulls aimed at the first device 410 and the second device 420, the transmission of the RTS-TRN frame 300 by the third device 430 produces reduced interference at the first device 410 and the second device 420, respectively.

Figure 4D:
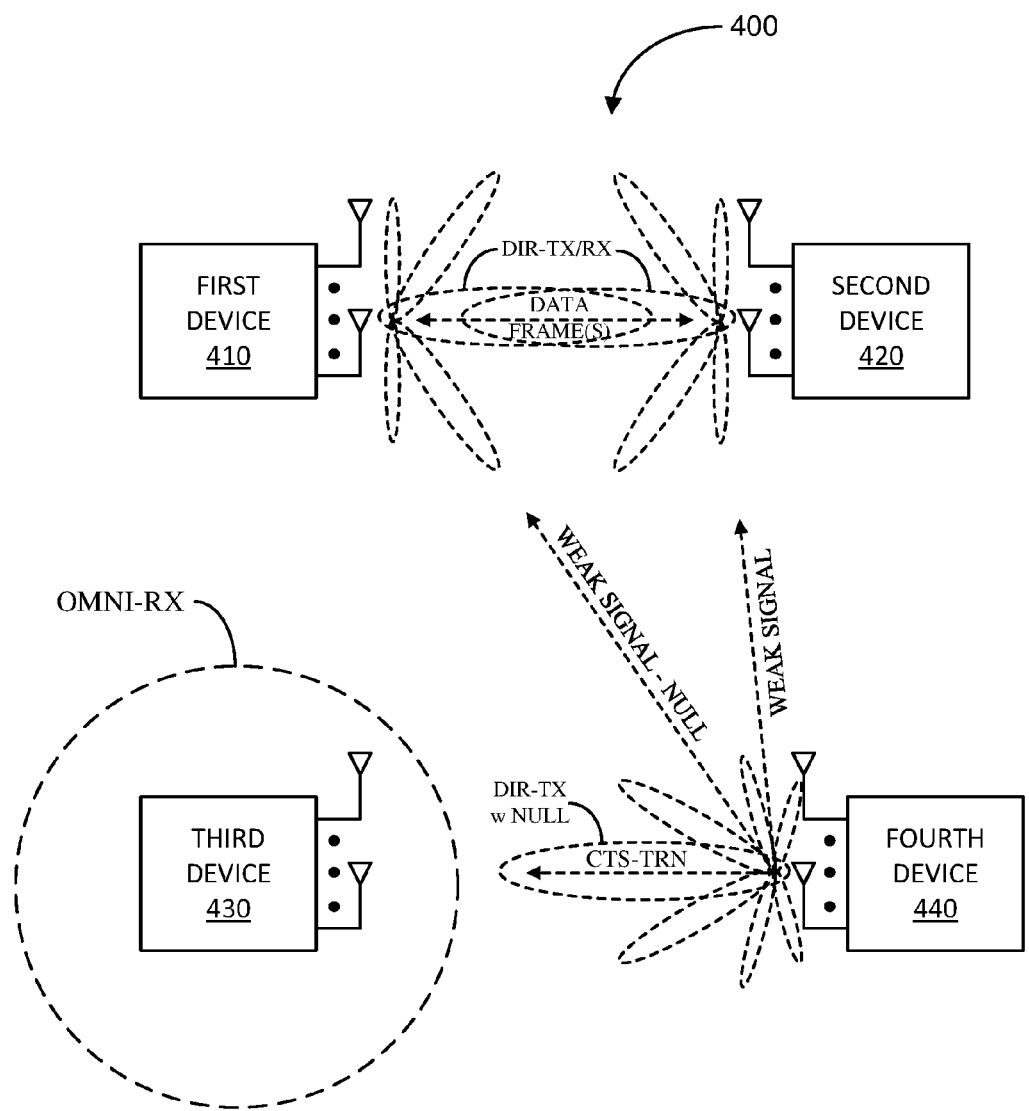
FIG. 4D illustrates a block diagram of an exemplary communication system in a fourth configuration in accordance with another aspect of the present disclosure.

FIG. 4D illustrates a block diagram of the exemplary communication system 400 in a fourth configuration in accordance with another aspect of the present disclosure. In the fourth configuration, the fourth device 440 transmits a CTS-TRN frame 350 to the third device 430 in response to receiving the RTS-TRN 300 from the third device 430. More specifically, the fourth device 440 configures its antenna to generate an antenna radiation pattern with a null aimed substantially at the first device 410 based on the beam training sequence of the RTS-TRN frame 300 received from the first device 410. As, in this example, the fourth device 440 did not receive the CTS-TRN frame 350 transmitted by the second device 420, the fourth device 400 does not know the direction to the second device 420, and thus, it is not able to configure its antenna radiation pattern with a null aimed at the second device 420.

Accordingly, with its antenna configured to generate an antenna radiation pattern with a null aimed substantially at the first device 410, the fourth device 440 transmits the CTS-TRN frame 350 to the third device 430. The null may be based on the estimated angle of arrival of the previously-received RTS-TRN frame 300. In general, the fourth device 440 generates an antenna radiation pattern with a desired signal power, rejection, or gain aimed at the first device 410 (e.g., to achieve an estimated interference at such device 410 to be at or below a defined threshold (e.g., to achieve a desired BER, SNR, SINR, and/or other one or more communication attributes)).

More specifically, the fourth device 440 may configure its antenna transmission radiation pattern by estimating antenna gain in the direction towards the first device 410, estimating the antenna reciprocity difference (e.g., transmit antenna gain–receive antenna gain) between the fourth device 440 and the first device 410, and calculating the above over one or more sectors to determine the corresponding estimated interference at the first devices 410. Since there is a null or desired small signal power directed at the first device 410, the transmission of the CTS-TRN frame 350 by the fourth device 440 produces reduced interference at the first device 410.

Alternatively, as the fourth device 440 has received the RTS-TRN frame 300 from the third device 430, which includes a beam training sequence, the fourth device 440 may optionally configure its antenna to generate an antenna radiation pattern with a primary lobe aimed substantially at the third device 430 and a null aimed substantially at the first device 410. In this regard, the antenna of the fourth device 440 is configured to improve the reception of the CTS-TRN frame 350 by the third device 430 while, at the same time, reduce interference at the first device 410 due to the transmission of the CTS-TRN frame 350.

Further, in accordance with the fourth configuration, the third device 430 has configured its antenna to receive in an omnidirectional manner (OMNI-RX). Thus, in this example, the third device 430 receives the CTS-TRN frame 350 while its antenna is configured to receive in the omnidirectional manner (OMNI-RX).

Figure 4E:
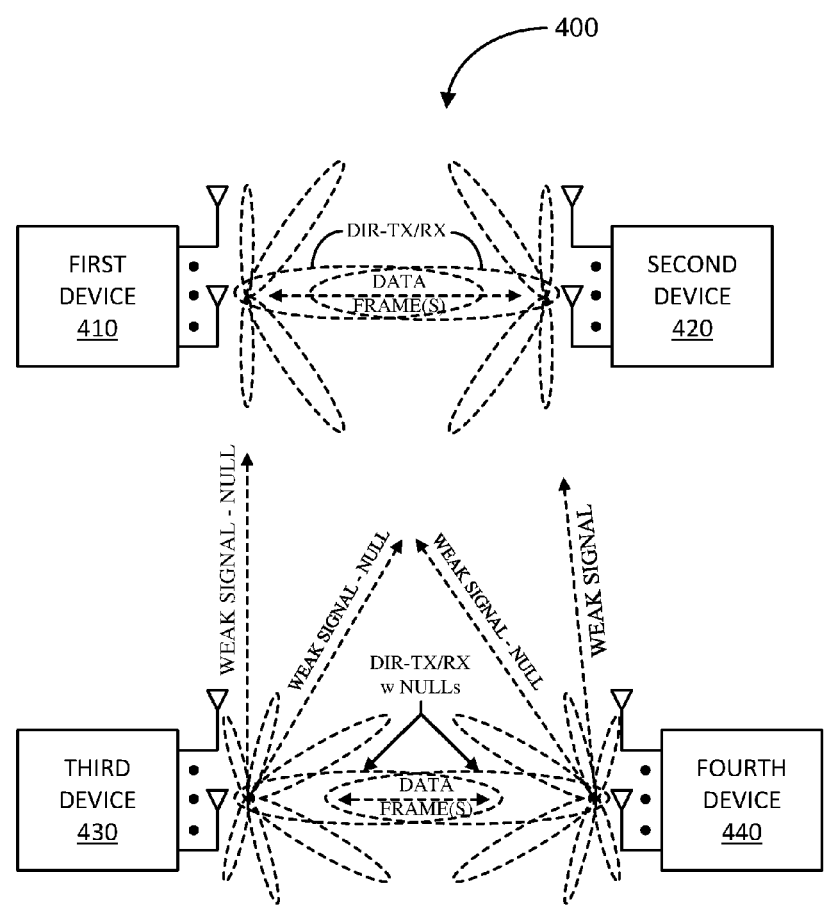
FIG. 4E illustrates a block diagram of an exemplary communication system in a fifth configuration in accordance with another aspect of the present disclosure.

FIG. 4E illustrates a block diagram of the exemplary communication system 400 in a fifth configuration in accordance with another aspect of the present disclosure. As the third device 430 has received the CTS-TRN frame 350 from the fourth device 440, the third device 430 configures its antenna for transmitting one or more data frames to the fourth device 440. In this regard, the third device 430 configures its antenna to generate an antenna radiation pattern with a first null aimed substantially at the first device 410 and a second null aimed substantially at the second device 420 based on the respective beam training sequences received via the RTS-TRN frame 300 and CTS-TRN frame 350 from the first device 410 and second device 420, respectively. Using this antenna configuration, the third device 430 transmits the one or more data frames to the fourth device 440.

Alternatively, as the third device 430 has received the CTS-TRN frame 350 from the fourth device 440, the third device 430 may configure its antenna to generate an antenna radiation pattern with a primary lobe aimed substantially at the fourth device 440 based on the beam training sequence received via the CTS-TRN frame 350 from the fourth device 440, and respective nulls aimed substantially at the first device 410 and second device 420 based on the beam training sequences received via the RTS-TRN frame 300 and CTS-TRN frame 350 from the first device 410 and second device 420, respectively.

In the fifth configuration, the fourth device 440 may configure its antenna to receive the one or more data frames in an omnidirectional manner (OMNI-RX). Optionally, since the fourth device 440 has received the RTS-TRN frame 300 from the third device 430, the fourth device 440 may configure its antenna to receive the one or more data frames in a directional manner. For example, in this regard, the fourth device 440 may configure its antenna to receive the one or more data frames with an antenna radiation pattern having a primary lobe aimed substantially at the third device 430 based on the beam training sequence received via the RTS-TRN frame 300 from the third device 430.

Once the fourth device 440 has completed receiving the one or more data frames from the third device 430, the fourth device 400 transmits an ACK frame 370 to the third device 430. In this regard, if the fourth device 400 determines that the first device 410 and the second device 420 are still communicating based on the duration in the RTS-TRN frame 300, the fourth device 400 transmits the ACK frame 370 with its antenna configured to generate an antenna radiation pattern with a null aimed substantially at the first device 410 to reduce interference at the first device 410 by the transmission of the ACK frame 370.

If, on the other hand, the fourth device 440 determines that the first device 410 is no longer communicating with the second device 420 based on the duration indicated in the RTS-TRN frame 300 received from the first device 410, the fourth device 440 may reconfigure its antenna to generate an antenna radiation pattern that does not necessarily have a null aimed substantially at the first device 410 for transmitting the ACK frame 370 to the third device 430. Although there may not be a null aimed substantially at the first device 410, the fourth device 440 may optionally transmit the ACK frame 370 to the third device 430 with its antenna configured to generate an antenna radiation pattern with a primary lobe aimed substantially at the third device 430.

The third device 430 and the fourth device 440 may continue to communicate with each other in the same manner or in the opposite manner (e.g., where the fourth device 440 generates the RTS-TRN frame 300 and the one or more data frames, and the third device 430 generates the CTS-TRN frame 350 and the ACK frame 370). Pursuant to such communication, if one or both the third device 430 or the fourth device 440 determine that the first device 410 and the second device 420 are still communicating with each other based on at least one duration indicated in at least one of the RTS-TRN frame 300 or CTS-TRN frame 350 transmitted by at least one of the first device 410 or the second device 420, at least one or both of the third device 430 or the fourth device 440 may configure its antenna to generate an antenna radiation pattern with at least one null aimed substantially at at least one of the first device 410 or the second device 420.

Figure 4F:
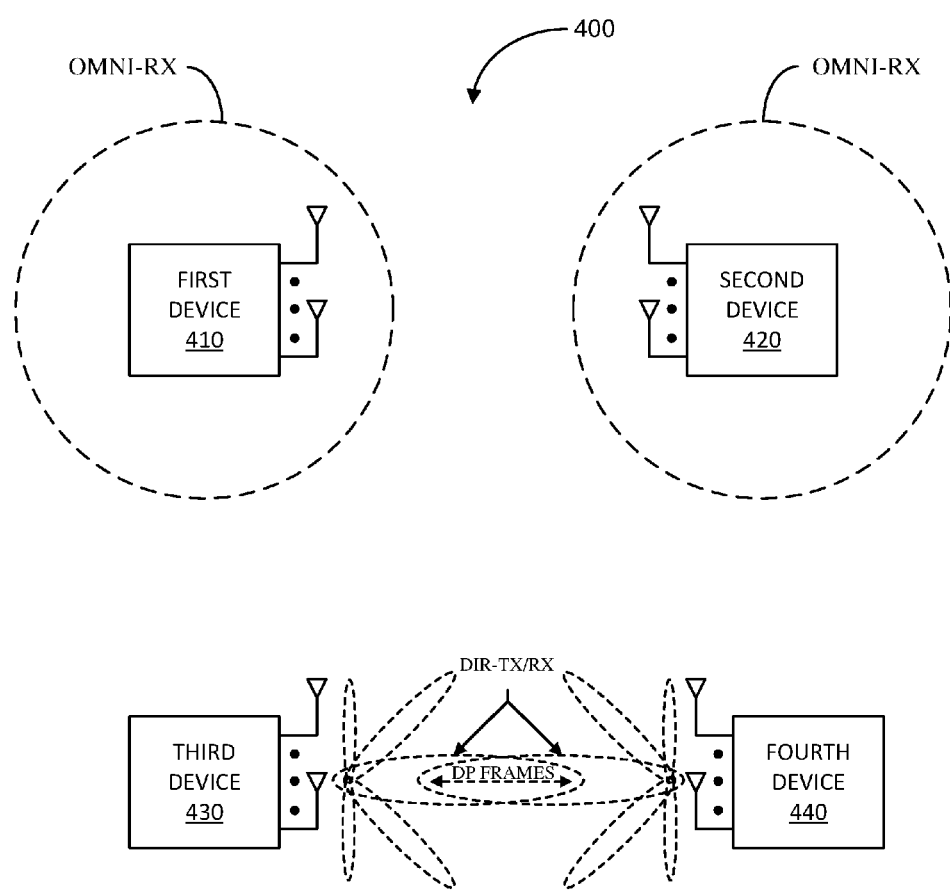
FIG. 4F illustrates a block diagram of an exemplary communication system in a sixth configuration in accordance with another aspect of the present disclosure.

FIG. 4F illustrates a block diagram of the exemplary communication system 400 in a sixth configuration in accordance with another aspect of the present disclosure. According to the sixth configuration, the first device 410 and the second device 420 has ceased communicating with each other. Accordingly, the first device 410 and the second device 420 may configure their respective antennas to receive in an omnidirectional manner (OMNI-RX) or in other manners as deemed appropriate.

Further, according to the sixth configuration, the third device 430 and the fourth device 440 are still communicating with each other. Based on at least one of the durations indicated in the RTS-TRN frame 300 or the CTS-TRN frame 350 from at least the first device 410 or the second device 420, the third device 430 and the fourth device 440 have determined that the first device 410 and the second device 420 are no longer communicating with each other. Accordingly, the third device 430 and the fourth device 440 no longer need to configure their respective antennas to generate respective antenna radiation patterns with nulls aimed at the first device 410 and the second device 420, as illustrated. The third device 430 and the fourth device 440 may transmit to each other in a directional manner (e.g., with their primary lobe aimed substantially at the other device).

Figure 5:
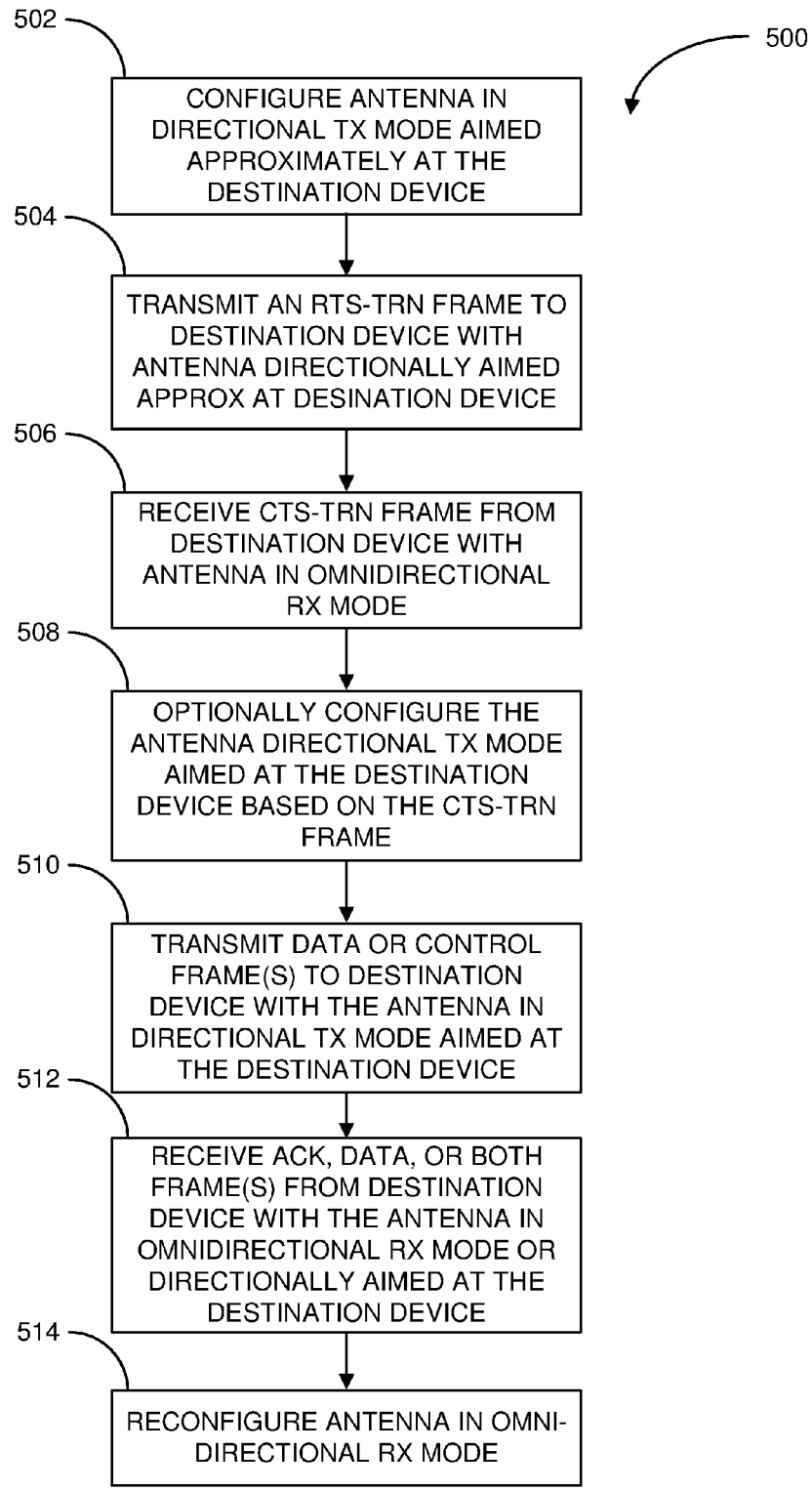
FIG. 5 illustrates a flow diagram of an exemplary method of wirelessly communicating with another device in accordance with certain aspects of the disclosure.

FIG. 5 illustrates a flow diagram of an exemplary method 500 of wirelessly communicating with another device in accordance with certain aspects of the disclosure. The method 500 may be implemented by an originating device, such as the first device 410, which transmits an RTS-TRN frame 300 for communication with a destination device, such as the second device 420. In this example, the originating device has not detected any interference from a neighboring device. That is, according to method 500, the originating device has not detected an RTS-TRN frame 300 or a CTS-TRN frame 350 from another device.

The method 500 comprises the originating device configuring its antenna for transmitting in a directional manner aimed approximately at a destination device (block 502). For example, the originating device may have previously communicated with or intercepted a transmission from the destination device allowing the originating device to estimate a direction towards the destination device. In this regard, with reference to the access point 110 or access terminal 120 illustrated in FIG. 2, the transmit processor 224 or 264 may configure the transceivers 226-1 to 226-N or 266-1 to 266-M to generate signals for the antennas 230-1 to 230-N or 270-1 to 270-M so that an antenna radiation pattern is generated with a primary lobe aimed substantially at the destination device, respectively. As it is well known, the transceivers 226-1 to 226-N or transceivers 266-1 to 266-M mixed the respective signals generated by the transmit processor 224 or 226 with different local oscillator signals having distinct relative amplitude/phases (e.g., also referred to as weights) to produce constructive interference to generate a primary lobe, constructive and destructive interference to generate non-primary lobes, and destructive interference to generate nulls.

The method 500 further comprises generating and transmitting an RTS-TRN 300 to the destination device via the antenna while the antenna is configured for directional transmission aimed at the destination device (block 504). In this regard, with reference to the access point 110 or access terminal 120 illustrated in FIG. 2, the transmit data processor 220 or 260 generates the data symbols for the RTS-TRN frame 300 based on data received from a data source 215 or 255. The frame builder 222 or 262 generates the RTS-TRN frame 300 including the data symbols associated with the RTS portion of the RTS-TRN frame 300 and the beam training sequence in the beam training sequence field 320. The transmit processor 224 or 264 acts as an interface for outputting the RTS-TRN frame 300 for transmission to the destination device.

The method 500 further comprises receiving a CTS-TRN frame 350 from the destination device via the antenna while the antenna is configured to receive in an omnidirectional manner (block 506). In this regard, with reference to the access point 110 or access terminal 120 illustrated in FIG. 2, the receive processor 242 or 282 may configure the transceivers 226-1 to 226-N or 266-1 to 266-M to configure the antennas 230-1 to 230-N or 270-1 to 270-M to receive signals in an omnidirectional manner, respectively.

The method 500 further comprises optionally configuring the antenna for directional transmission to the destination device based on the beam training sequence in the beam training sequence field 368 of the CTS-TRN frame 350 received from the destination device (block 508). Similarly, with reference to the access point 110 or access terminal 120 illustrated in FIG. 2, the transmit processor 224 or 264 may configure the transceivers 226-1 to 226-N or 266-1 to 266-M to generate signals for the antennas 230-1 to 230-N or 270-1 to 270-M so that an antenna radiation pattern is generated with a primary lobe aimed substantially at the destination device, respectively.

The method 500 further comprises generating and transmitting one or more data or control frames to the destination device via the antenna while the antenna is configured for directional transmission aimed at the destination device (block 510). Similarly, with reference to the access point 110 or access terminal 120 illustrated in FIG. 2, the transmit data processor 220 or 260 generates the data symbols for the one or more data or control frames based on data received from a data source 215 or 255. The frame builder 222 or 262 generates the one or more data or control frames. The transmit processor 224 or 264 acts as an interface for outputting the one or more data or control frames for transmission to the destination device. Alternatively, or in addition to, the method 500 may comprise receiving one or more data or control frames from the destination device.

The method 500 further comprises receiving one or more ACK, data, or ACK and data frames 370 from the destination device via the antenna while the antenna is configured to receive in an omnidirectional manner or optionally in a directional manner aimed at the destination device (block 512). In this regard, with reference to the access point 110 or access terminal 120 illustrated in FIG. 2, the receive processor 242 or 282 may configure the transceivers 226-1 to 226-N or 266-1 to 266-M to configure the antennas 230-1 to 230-N or 270-1 to 270-M to receive signals in an omnidirectional manner, respectively. Alternatively, the receive processor 242 or 282 may configure the transceivers 226-1 to 226-N or 266-1 to 266-M to configure the antennas 230-1 to 230-N or 270-1 to 270-M to receive signals in a directional manner aimed at the destination device, respectively.

The method 500 further comprises reconfiguring the antenna to receive in an omnidirectional manner once the communications with the destination device has ceased (block 514). In this regard, with reference to the access point 110 or access terminal 120 illustrated in FIG. 2, the receive processor 242 or 282 may configure the transceivers 226-1 to 226-N or 266-1 to 266-M to configure the antennas 230-1 to 230-N or 270-1 to 270-M to receive signals in an omnidirectional manner, respectively.

Figure 6:
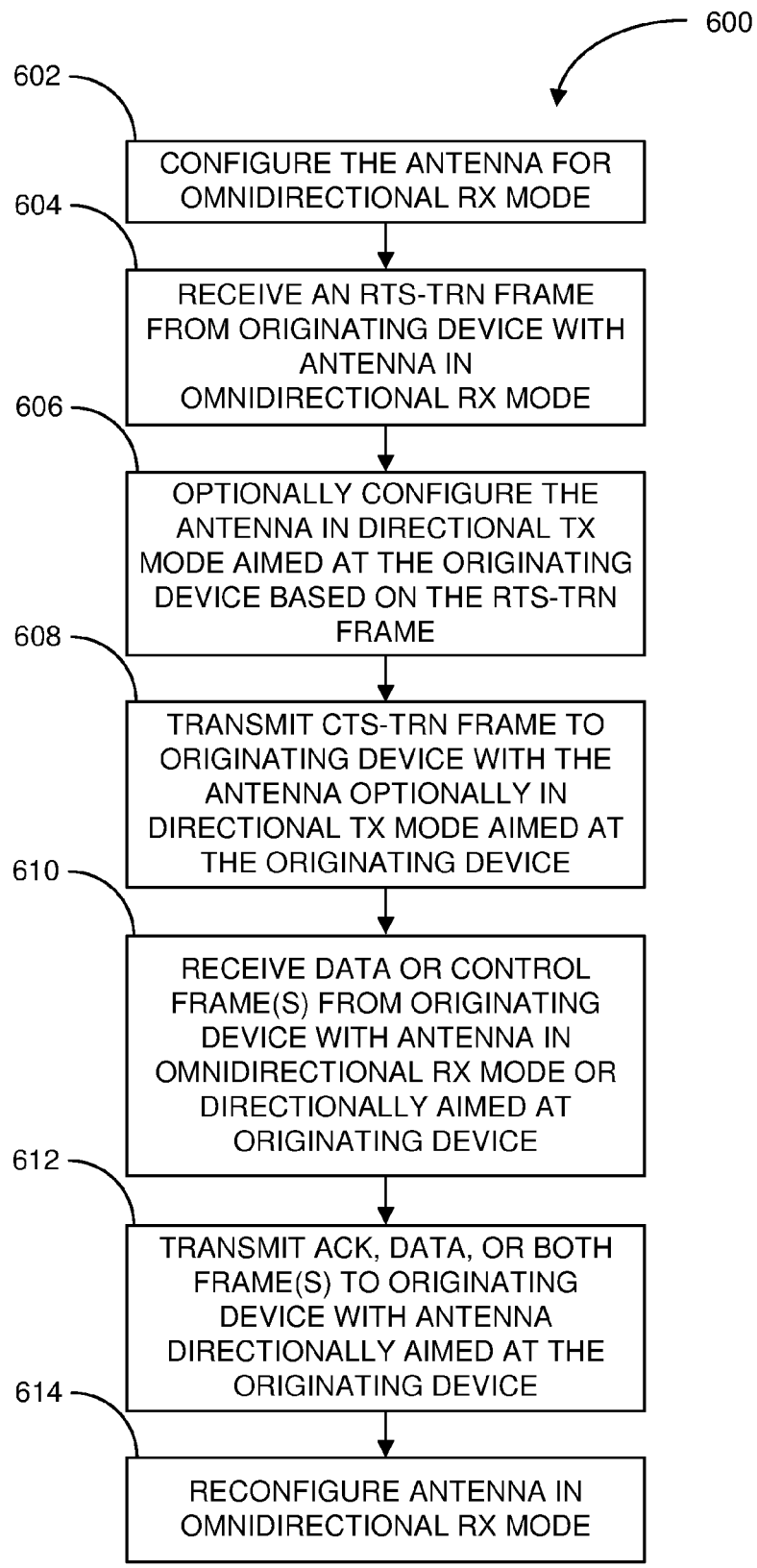
FIG. 6 illustrates a flow diagram of another exemplary method of wirelessly communicating with another device in accordance with certain aspects of the disclosure.

FIG. 6 illustrates a flow diagram of another exemplary method 600 of wirelessly communicating with another device in accordance with certain aspects of the disclosure. The method 600 may be implemented by a destination device, such as the second device 420, which transmits a CTS-TRN frame 350 in response to receiving an RTS-TRN frame 300 from an originating device, such as the first device 410. In accordance with exemplary method 600, the destination device has not detected interference from a neighboring device, for example, by receiving another RTS-TRN frame 300 or a CTS-TRN frame 350 from the neighboring device.

The method 600 comprises configuring its antenna for receiving signals in an omnidirectional manner (block 602). In this regard, with reference to the access point 110 or access terminal 120 illustrated in FIG. 2, the receive processor 242 or 282 may configure the transceivers 226-1 to 226-N or 266-1 to 266-M to configure the antennas 230-1 to 230-N or 270-1 to 270-M to receive signals in an omnidirectional manner, respectively.

The method 600 further comprises receiving an RTS-TRN frame 300 from the originating device while the antenna is configured to receive in an omnidirectional manner (block 604). In this regard, with reference to the access point 110 or access terminal 120 illustrated in FIG. 2, the receive processor 242 or 282, controller 234 or 274, and receive data processor 244 or 284 operate together to process the received RTS-TRN frame 300 to extract the data from the RTS-TRN frame 300, respectively. The data informs the destination device of the identity of the originating device (e.g., based on the data in the transmitter address field 316 of the RTS-TRN frame 300), that the originating device desires to communicate with the destination device (e.g., based on the data in the frame control field 310 that indicates that the frame is an RTS type frame), and that the destination device is the intended receiver for the RTS-TRN frame 300 (e.g., based on the data in the receiver address field 314 of the RTS-TRN frame 300).

The method 600 further comprises optionally configuring its antenna for transmitting in a directional manner aimed substantially at the originating device based on the beam training sequence in the beam training sequence field 320 of the received RTS-TRN frame 300 (block 606). In this regard, with reference to the access point 110 or access terminal 120 illustrated in FIG. 2, the transmit processor 224 or 264 may configure the transceivers 226-1 to 226-N or 266-1 to 266-M to generate signals for the antennas 230-1 to 230-N or 270-1 to 270-M so that an antenna radiation pattern is generated with a primary lobe aimed substantially at the originating device, respectively.

The method 600 further comprises generating and transmitting a CTS-TRN frame 350 to the originating device via the antenna while the antenna is configured for directional transmission aimed at the originating device (block 608). In this regard, with reference to the access point 110 or access terminal 120 illustrated in FIG. 2, the transmit data processor 220 or 260 generates the data symbols for the CTS-TRN frame 350 based on data received from a data source 215 or 255. The frame builder 222 or 262 generates the CTS-TRN frame 350 including the data symbols associated with the CTS portion of the CTS-TRN frame 350 and the beam training sequence in the beam training sequence field 368. The transmit processor 224 or 264 acts as an interface for outputting the CTS-TRN frame 350 for transmission to the originating device.

The method 600 further comprises receiving one or more data or control frames from the destination device via the antenna while the antenna is configured to receive in an omnidirectional manner or optionally in a directional manner aimed substantially at the originating device based on the beam training sequence previously received via the RTS-TRN frame 300 (block 610). In this regard, with reference to the access point 110 or access terminal 120 illustrated in FIG. 2, the receive processor 242 or 282 may configure the transceivers 226-1 to 226-N or 266-1 to 266-M to configure the antennas 230-1 to 230-N or 270-1 to 270-M to receive signals in an omnidirectional manner, respectively. Alternatively, the receive processor 242 or 282 may configure the transceivers 226-1 to 226-N or 266-1 to 266-M to configure the antennas 230-1 to 230-N or 270-1 to 270-M to receive signals in a directional manner aimed at the originating device, respectively. Further, in this regard, with reference to the access point 110 or access terminal 120 illustrated in FIG. 2, the receive processor 242 or 282, controller 234 or 274, and receive data processor 244 or 284 operate together to process the received one or more data or control frames to extract information therefrom, respectively.

The method 600 further comprises generating and transmitting one or more ACK, data, or ACK and data frames 370 to the originating device via the antenna while the antenna is configured for directional transmission aimed at the originating device (block 612). Similarly, with reference to the access point 110 or access terminal 120 illustrated in FIG. 2, the transmit data processor 220 or 260 generates the data symbols for the one or more data or control frames 370 based on data received from a data source 215 or 255. The frame builder 222 or 262 generates the one or more data or control frames 370. The transmit processor 224 or 264 acts as an interface for outputting the one or more data or control frames 370 for transmission to the originating device.

The method 600 further comprises reconfiguring the antenna to receive an in omnidirectional manner once the communications with the originating device is completed (block 614). In this regard, with reference to the access point 110 or access terminal 120 illustrated in FIG. 2, the receive processor 242 or 282 may configure the transceivers 226-1 to 226-N or 266-1 to 266-M to configure the antennas 230-1 to 230-N or 270-1 to 270-M to receive signals in an omnidirectional manner, respectively.

Figure 7:
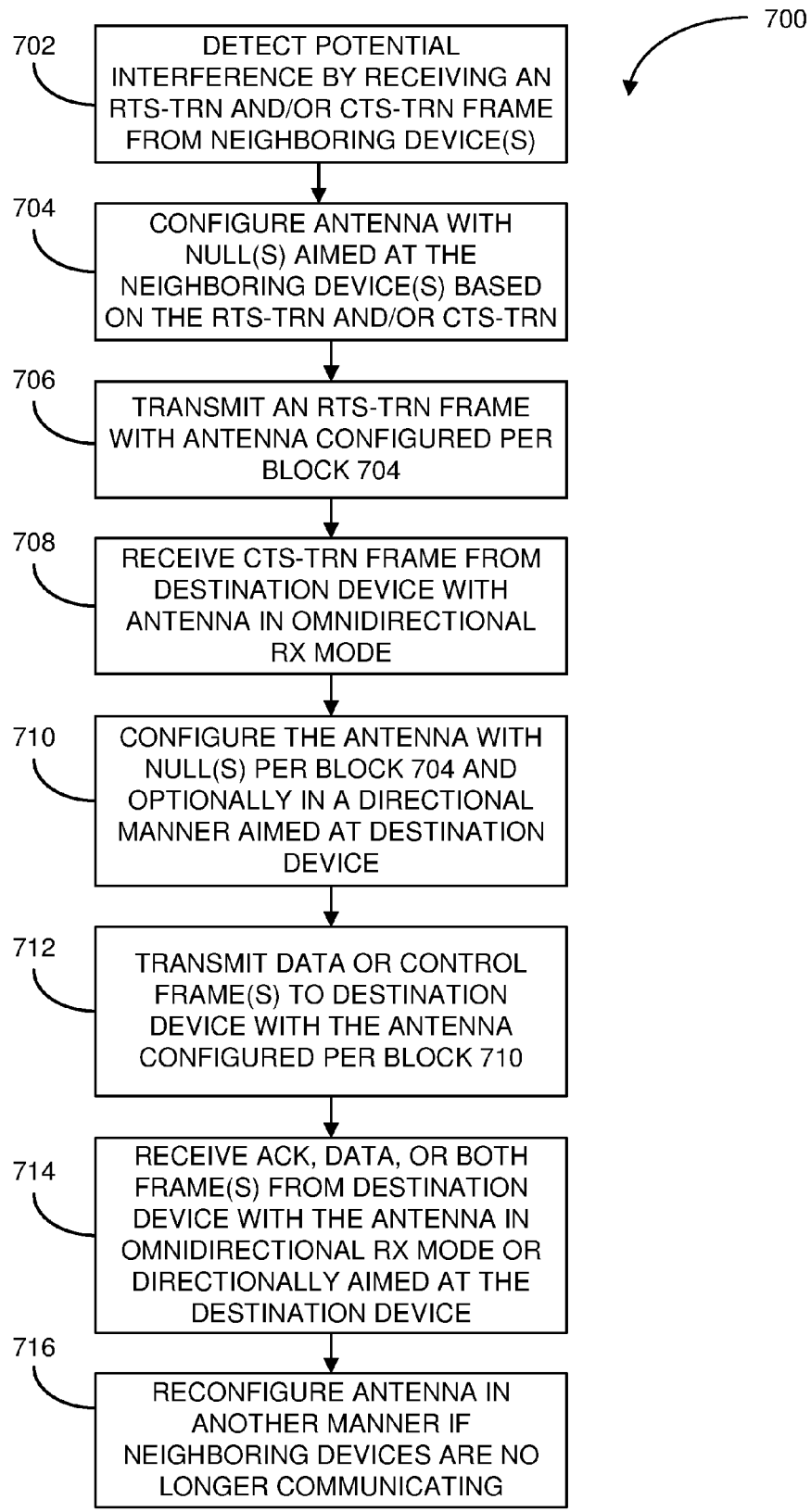
FIG. 7 illustrates a flow diagram of yet another exemplary method of wirelessly communicating with another device in accordance with certain aspects of the disclosure.

FIG. 7 illustrates a flow diagram of an exemplary method 700 of wirelessly communicating with another device in accordance with certain aspects of the disclosure. The method 700 may be implemented by an originating device, such as the third device 430, which transmits an RTS-TRN frame 300 for communication with a destination device, such as the fourth device 440. In this example, the originating device has detected interference from one or more neighboring devices. That is, according to method 700, the originating device has detected at least one of an RTS-TRN frame 300 or a CTS-TRN frame 350 from at least one other device.

The method 700 comprises detecting potential interference by receiving at least one of an RTS-TRN frame 300 or a CTS-TRN frame 350 from one or more neighboring devices, respectively (block 702). The at least one of the RTS-TRN frame 300 or CTS frame 350 may have been received via an antenna configured to receive in an omnidirectional manner. In this regard, with reference to the access point 110 or access terminal 120 illustrated in FIG. 2, the receive processor 242 or 282 may have configured the transceivers 226-1 to 226-N or 266-1 to 266-M to configure the antennas 230-1 to 230-N or 270-1 to 270-M to receive signals in an omnidirectional manner, respectively.

Further, in this regard, the receive processor 242 or 282, controller 234 or 274, and receive data processor 244 or 284 operate together to process the at least one of the received RTS-TRN frame 300 or CTS-TRN frame to extract the data from the at least one of the RTS-TRN frame 300 or CTS-TRN frame 350, respectively. The data informs the originating device that the at least one of the RTS-TRN frame 300 or the CTS-TRN frame 350 are not intended for the originating device (e.g., based on the data in the receiver address field 314 or 364 of the RTS-TRN frame 300 or CTS-TRN frame 350); and therefore, future communications by the one or more neighboring devices should be treated as potential interference. Additionally, the data in the duration field of the at least one of the RTS-TRN frame 300 or CTS-TRN frame 350 provide an indication as to how long the one or more neighboring devices will be communicating. Such data is used to maintain antenna radiation patterns with null(s) aimed at the one or more neighboring devices as long as the neighboring devices are communicating pursuant to the duration information.

As an example, once the originating device has received the at least one of the RTS-TRN frame 300 or CTS-TRN frame 350 from one or more neighboring devices, the originating device may organize the information for interference reduction in accordance with following table I:

TABLE I

| Entry Number | Antenna Configuration | Duration |
|---|---|---|
| 1 | First null at Azimuth Angle A1 and Elevation Angle A2 (for first neighboring device of first set) Second null at Azimuth Angle B1 and Elevation Angle B2 (for second neighboring device of first set) | 10 ms |
| 2 | Null(s) Azimuth and Elevation Angles for second set of one or more other neighboring device(s) | Second Associated Duration |
| . . . | . . . | . . . |
| N | Null(s) Azimuth and Elevation Angles for Nth set of one or more other neighboring device(s) . . . | Nth Associated Duration |

Thus, per Table I, the originating device may keep an entry for each set of communicating neighboring devices or for each set of at least one of an RTS-TRN or a CTS-TRN frame received from one or more communicating neighboring devices. In the example of Table I, there are N entries, where N is an integer of one or more. For each entry, the originating device may include information as to the corresponding antenna configuration and the duration for which the antenna configuration is valid. For example, in the Entry No. 1, the antenna configuration may include a first null at an azimuth angle A1 and elevation angle A2 to reduce interference at a first neighboring device, and a second null at an azimuth angle B1 and elevation angle B2 to reduce interference at a second neighboring device. The antenna configuration of Entry No. 1 is valid for 10 milliseconds (ms). The other entries, if any, may include other antenna configuration(s) and associated duration(s) for one or more other sets of communicating neighboring device(s).

Once the associated duration has expired, the corresponding entry including the corresponding antenna configuration may be deleted from Table I. Such antenna configuration may no longer be valid for the originating device to use for transmitting signals to other devices. In such case, the originating device may use an antenna configuration associated with a valid entry in Table I.

The method 700 further comprises configuring its antenna to generate an antenna radiation pattern with at least one null aimed substantially at the at least one neighboring device based on at least the beam training sequence in the at least one of the received RTS-TRN frame 300 or CTS-TRN frame 350 (block 704). In addition to the one or more nulls, the antenna may be configured to generate the antenna radiation pattern with a primary lobe aimed substantially at a destination device. In this regard, with reference to the access point 110 or access terminal 120 illustrated in FIG. 2, the transmit processor 224 or 264 may configure the transceivers 226-1 to 226-N or 266-1 to 266-M to generate signals for the antennas 230-1 to 230-N or 270-1 to 270-M so that an antenna radiation pattern includes the aforementioned one or more nulls and the optional primary lobe.

The method 700 further comprises generating and transmitting an RTS-TRN frame 300 to the destination device via the antenna while the antenna is configured per block 704 (block 706). In this regard, with reference to the access point 110 or access terminal 120 illustrated in FIG. 2, the transmit data processor 220 or 260 generates the data symbols for the RTS-TRN frame 300 based on data received from a data source 215 or 255. The frame builder 222 or 262 generates the RTS-TRN frame 300 including the data symbols associated with the RTS portion of the RTS-TRN frame 300 and the beam training sequence in the beam training sequence field 320. The transmit processor 224 or 264 acts as an interface for outputting the RTS-TRN frame 300 for transmission to the destination device.

The method 700 further comprises receiving a CTS-TRN frame 350 from the destination device via the antenna while the antenna is configured to receive in an omnidirectional manner (block 708). In this regard, with reference to the access point 110 or access terminal 120 illustrated in FIG. 2, the receive processor 242 or 282 may configure the transceivers 226-1 to 226-N or 266-1 to 266-M to configure the antennas 230-1 to 230-N or 270-1 to 270-M to receive signals in an omnidirectional manner, respectively. Further, the receive processor 242 or 282, controller 234 or 274, and receive data processor 244 or 284 operate together to process the CTS-TRN frame 350 to extract the data from the CTS-TRN frame 350, respectively. The data informs the originating device that the communication medium is available for transmission to the destination device (e.g., based on the data in the frame control field 360 indicating it is a CTS type frame and the data in the receiver address field 364 indicating that the CTS-TRN frame 350 is intended for the originating device).

The method 700 further comprises configuring the antenna per block 704 (e.g., to generate an antenna radiation pattern with one or more nulls aimed substantially at one or more neighboring devices and optionally with a primary lobe aimed substantially at the destination device) (block 710). Similarly, with reference to the access point 110 or access terminal 120 illustrated in FIG. 2, the transmit processor 224 or 264 may configure the transceivers 226-1 to 226-N or 266-1 to 266-M to generate signals for the antennas 230-1 to 230-N or 270-1 to 270-M so that an antenna radiation pattern is generated with one or more nulls aimed at one or more neighboring devices based on the received one or more RTS-TRN frame 300 or CTS-TRN frame 350 from the one or more neighboring devices, and optionally a primary lobe aimed substantially at the destination device, respectively.

The method 700 further comprises generating and transmitting one or more data or control frames to the destination device via the antenna while the antenna is configured per block 710 (block 712). Similarly, with reference to the access point 110 or access terminal 120 illustrated in FIG. 2, the transmit data processor 220 or 260 generates the data symbols for the one or more data or control frames based on data received from a data source 215 or 255. The frame builder 222 or 262 generates the one or more data or control frames. The transmit processor 224 or 264 acts as an interface for outputting the one or more data or control frames for transmission to the destination device.

The method 700 further comprises receiving one or more ACK, data, or ACK and data frames 370 from the destination device via the antenna while the antenna is configured to receive in an omnidirectional manner or optionally in a directional manner aimed at the destination device (block 714). In this regard, with reference to the access point 110 or access terminal 120 illustrated in FIG. 2, the receive processor 242 or 282 may configure the transceivers 226-1 to 226-N or 266-1 to 266-M to configure the antennas 230-1 to 230-N or 270-1 to 270-M to receive signals in an omnidirectional manner, respectively. Alternatively, the receive processor 242 or 282 may configure the transceivers 226-1 to 226-N or 266-1 to 266-M to configure the antennas 230-1 to 230-N or 270-1 to 270-M to receive signals in a directional manner aimed at the destination device, respectively.

Further, the receive processor 242 or 282, controller 234 or 274, and receive data processor 244 or 284 operate together to process the one or more ACK, data, or ACK and data frames 370 to extract the data from the one or more ACK, data, or ACK and data frames 370, respectively. The data may inform the originating device that the destination device successfully received the one or more data frames (e.g., based on the data in the frame control field 360 indicating it is an ACK type frame and the data in the receiver address field 364 indicating that the ACK frame 370 is intended for the originating device).

The method 700 further comprises reconfiguring the antenna to transmit in another configuration if the originating device has determined that the one or more neighboring devices are no longer communicating because of the duration indicated in the one or more duration field 312 or 362 of the at least one RTS-TRN frame 300 or CTS-TRN frame 350 has expired or is no longer valid (block 716). Such other configuration may include the antenna generating an antenna radiation pattern not necessarily having one or more nulls aimed substantially at the one or more neighboring devices, respectively. In this regard, with reference to the access point 110 or access terminal 120 illustrated in FIG. 2, the transmit processor 224 or 264 may configure the transceivers 226-1 to 226-N or 266-1 to 266-M to configure the antennas 230-1 to 230-N or 270-1 to 270-M to effectuate the reconfiguration of the antenna, respectively.

Figure 8:
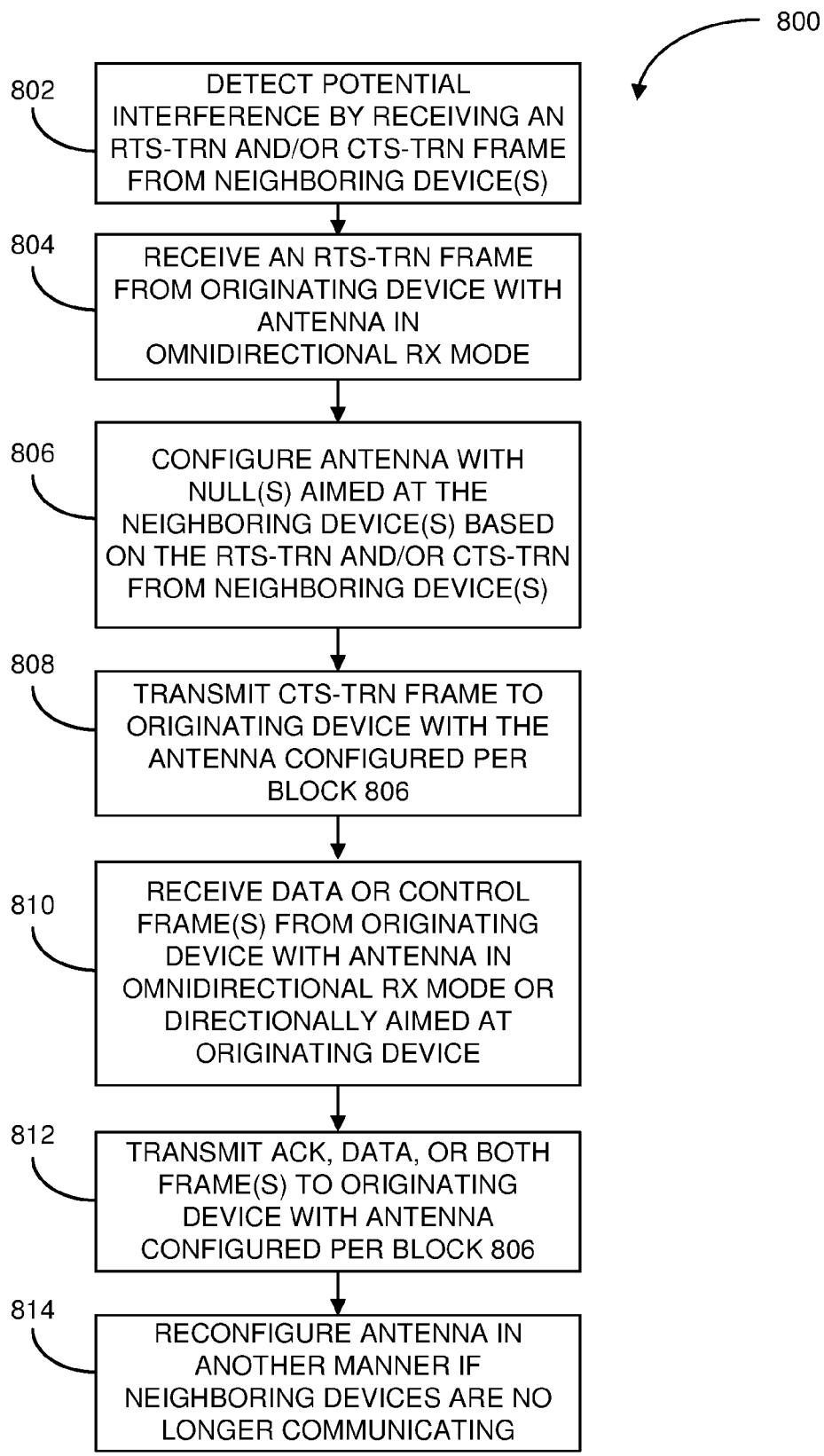
FIG. 8 illustrates a flow diagram of still another exemplary method of wirelessly communicating with another device in accordance with certain aspects of the disclosure.

FIG. 8 illustrates a flow diagram of another exemplary method 800 of wirelessly communicating with another device in accordance with certain aspects of the disclosure. The method 800 may be implemented by a destination device, such as the fourth device 440, which transmits a CTS-TRN frame 350 in response to receiving an RTS-TRN frame 300 from an originating device, such as the third device 430. In accordance with exemplary method 800, the destination device has detected interference from one or more neighboring devices by detecting at least one of an RTS-TRN frame 300 or a CTS-TRN frame 350 from such one or more neighboring devices.

The method 800 comprises detecting potential interference by receiving at least one of an RTS-TRN frame 300 or a CTS-TRN frame 350 from one or more neighboring devices, respectively (block 802). The at least one of the RTS-TRN frame 300 or CTS frame 350 may have been received via an antenna configured to receive in an omnidirectional manner. In this regard, with reference to the access point 110 or access terminal 120 illustrated in FIG. 2, the receive processor 242 or 282 may have configured the transceivers 226-1 to 226-N or 266-1 to 266-M to configure the antennas 230-1 to 230-N or 270-1 to 270-M to receive signals in an omnidirectional manner, respectively.

Further, in this regard, the receive processor 242 or 282, controller 234 or 274, and receive data processor 244 or 284 operate together to process at least one of the received RTS-TRN frame 300 or CTS-TRN frame to extract the data from the at least one of the RTS-TRN frame 300 or CTS-TRN frame 350, respectively. The data informs the destination device that the at least one of the RTS-TRN 300 or the CTS-TRN are not intended for the destination device (e.g., based on the data in the receiver address field 314 or 364 of the RTS-TRN frame 300 or CTS-TRN frame 350); and therefore, future communications by the one or more neighboring devices should be treated as potential interference. Additionally, the data in the duration field of the at least one of the RTS-TRN frame 300 or CTS-TRN frame 350 provide an indication as to how long the one or more neighboring devices will be communicating. Such data is used to maintain antenna radiation patterns with null(s) aimed at the one or more neighboring devices as long as the neighboring devices are communicating pursuant to the duration information.

The method 800 further comprises receiving an RTS-TRN frame 300 from the originating device while the antenna is configured to receive in an omnidirectional manner (block 804). In this regard, with reference to the access point 110 or access terminal 120 illustrated in FIG. 2, the receive processor 242 or 282, controller 234 or 274, and receive data processor 244 or 284 operate together to process the received RTS-TRN frame 300 to extract the data from the RTS-TRN frame 300. The data informs the destination device of the identity of the originating device (e.g., based on the data in the transmitter address field 316 of the RTS-TRN frame 300), that the originating device desires to communicate with the destination device (e.g., based on the data in the frame control field 310 indicating that the frame is an RTS type frame), and that the destination device is the intended receiver for the RTS-TRN frame 300 (e.g., based on the data in the receiver address field 314 of the RTS-TRN frame 300). Similar to the originating device, the destination device may organize information for interference reduction per Table I described above.

The method 800 further comprises configuring its antenna to generate an antenna radiation pattern with at least one null aimed substantially at the at least one neighboring device based on at least the beam training sequence in the at least one of the received RTS-TRN frame 300 or CTS-TRN frame 350 (block 806). In addition to the one or more nulls, the antenna may be configured to generate the antenna radiation pattern with a primary lobe aimed substantially at the originating device based on the beam training sequence of the RTS-TRN frame 300 received from the originating device. In this regard, with reference to the access point 110 or access terminal 120 illustrated in FIG. 2, the transmit processor 224 or 264 may configure the transceivers 226-1 to 226-N or 266-1 to 266-M to generate signals for the antennas 230-1 to 230-N or 270-1 to 270-M so that an antenna radiation pattern includes the aforementioned one or more nulls and the optional primary lobe.

The method 800 further comprises generating and transmitting a CTS-TRN frame 350 to the originating device via the antenna while the antenna is configured as per block 806 (block 808). In this regard, with reference to the access point 110 or access terminal 120 illustrated in FIG. 2, the transmit data processor 220 or 260 generates the data symbols for the CTS-TRN frame 350 based on data received from a data source 215 or 255. The frame builder 222 or 262 generates the CTS-TRN frame 300 including the data symbols associated with the CTS portion of the CTS-TRN frame 350 and the beam training sequence in the beam training sequence field 368. The transmit processor 224 or 264 acts as an interface for outputting the CTS-TRN frame 350 for transmission to the originating device.

The method 800 further comprises receiving one or more data or control frames from the originating device via the antenna while the antenna is configured to receive in an omnidirectional manner or optionally in a directional manner aimed substantially at the originating device based on the beam training sequence previously received via the RTS-TRN frame 300 (block 810). In this regard, with reference to the access point 110 or access terminal 120 illustrated in FIG. 2, the receive processor 242 or 282 may configure the transceivers 226-1 to 226-N or 266-1 to 266-M to configure the antennas 230-1 to 230-N or 270-1 to 270-M to receive signals in an omnidirectional manner, respectively. Alternatively, the receive processor 242 or 282 may configure the transceivers 226-1 to 226-N or 266-1 to 266-M to configure the antennas 230-1 to 230-N or 270-1 to 270-M to receive signals in a directional manner aimed at the originating device, respectively. Further, in this regard, with reference to the access point 110 or access terminal 120 illustrated in FIG. 2, the receive processor 242 or 282, controller 234 or 272, and receive data processor 244 or 282 operate together to process the received one or more data or control frames to extract the information therefrom, respectively.

The method 800 further comprises generating and transmitting one or more ACK, data, or ACK and data frames 370 to the originating device via the antenna while the antenna is configured per block 806 (block 812). Similarly, with reference to the access point 110 or access terminal 120 illustrated in FIG. 2, the transmit data processor 220 or 260 generates the data symbols for the one or more ACK, data, or ACK and data frames 370 based on data received from a data source 215 or 255. The frame builder 222 or 262 generates the one or more ACK, data, or ACK and data frames 370. The transmit processor 224 or 264 acts as an interface for outputting the one or more ACK, data, or ACK and data frames 370 for transmission to the originating device.

The method 800 further comprises reconfiguring the antenna to transmit in another configuration if the destination device has determined that the one or more neighboring devices are no longer communicating based on the duration indicated in the one or more duration field 312 or 362 of the at least one RTS-TRN frame 300 or CTS-TRN frame 350 has expired or is no longer valid (block 814). Such other configuration may include the antenna generating an antenna radiation pattern not necessarily having one or more nulls aimed substantially at the one or more neighboring devices, respectively. In this regard, with reference to the access point 110 or access terminal 120 illustrated in FIG. 2, the transmit processor 224 or 264 may configure the transceivers 226-1 to 226-N or 266-1 to 266-M to configure the antennas 230-1 to 230-N or 270-1 to 270-M to effectuate the reconfiguration of the antenna, respectively.

Figure 9:
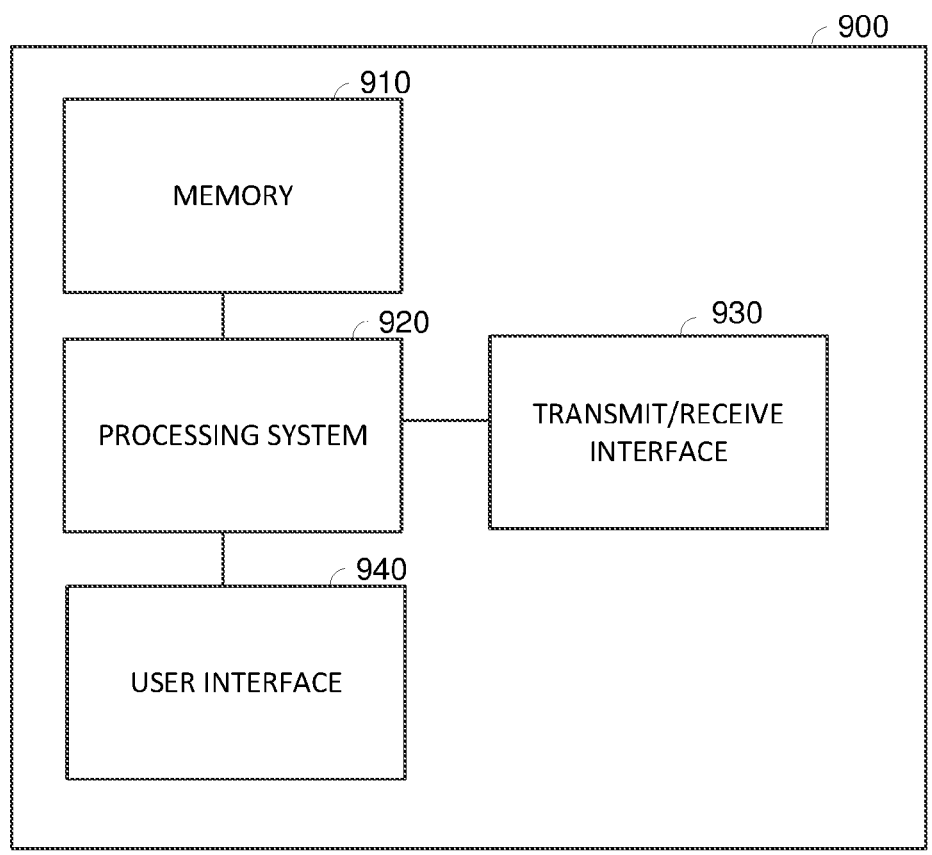
FIG. 9 illustrates a block diagram of an exemplary device in accordance with certain aspects of the present disclosure.

FIG. 9 illustrates an example device 900 according to certain aspects of the present disclosure. The device 900 may be configured to operate in an access point (e.g., access point 110) or an access terminal (e.g., access terminal) and to perform one or more of the operations described herein. The device 900 includes a processing system 920, and a memory 910 coupled to the processing system 920. The memory 910 may store instructions that, when executed by the processing system 920, cause the processing system 920 to perform one or more of the operations described herein. Exemplary implementations of the processing system 920 are provided below. The device 900 also comprises a transmit/receiver interface 930 coupled to the processing system 920. The interface 930 (e.g., interface bus) may be configured to interface the processing system 920 to a radio frequency (RF) front end (e.g., transceivers 226-1 to 226-N, 266-1 to 226-M), as discussed further below.

In certain aspects, the processing system 920 may include one or more of the following: a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein. In these aspects, the processing system 920 may generate a frame and output the frame to an RF front end (e.g., transceiver 226-1 to 226-N or 266-1 to 266-M) via the interface 930 for wireless transmission (e.g., to an access point or an access terminal).

In certain aspects, the processing system 920 may include one or more of the following: a receive processor (e.g., receive processor 242 or 282), a receive data processor (e.g., receive data processor 244 or 284) and/or a controller (e.g., controller 234 and 274) for performing one or more of the operations described herein. In these aspects, the processing system 920 may receive a frame from an RF front end (e.g., transceivers 226-1 to 226-N or 266-1 to 266-M) via the interface 930 and process the frame according to any one or more of the aspects discussed above.

In the case of an access terminal 120, the device 900 may include a user interface 940 coupled to the processing system 920. The user interface 940 may be configured to receive data from a user (e.g., via keypad, mouse, joystick, etc.) and provide the data to the processing system 920. The user interface 940 may also be configured to output data from the processing system 920 to the user (e.g., via a display, speaker, etc.). In this case, the data may undergo additional processing before being output to the user. In the case of an access point 110, the user interface 940 may be omitted.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The processing system 920 and frame builders 222 and 262 are each examples of means for generating a first frame including a Request to Send (RTS) portion and a first beam training sequence. The transmit/receive interface 930 and transmit processors 224 and 264 are each examples of means for outputting the first frame for transmission to a device. The transmit/receive interface 930 and transceivers 226-1 to 226-N and 266-1 to 266-M are each examples of means for configuring an antenna to transmit the first frame in a directional manner. The transmit/receive interface 930 and transceivers 226-1 to 226-N and 266-1 to 266-M are each examples of means for configuring an antenna to transmit the first frame with an antenna radiation pattern having a primary lobe aimed substantially at the device.

The processing system 920, transceivers 226-1 to 226-N and 266-1 to 266-M, and receive processors 242 and 282 are each examples of means for receiving a second frame from the device in response to transmitting the first frame, wherein the second frame comprises a Clear to Send (CTS) portion and a second beam training sequence. The processing system 920 and frame builders 222 and 262 are each examples of means for generating one or more data frames in response to receiving the second frame. The transmit/receive interface 930 and transmit processors 224 and 264 are each examples of means for outputting the one or more data frames for transmission to the device.

The transmit/receive interface 930 and transceivers 226-1 to 226-N and 266-1 to 266-M are each examples of means for configuring an antenna to transmit the one or more data frames with an antenna transmission radiation pattern having a primary lobe aimed substantially at the device based on the second beam training sequence. The processing system 920, transceivers 226-1 to 226-N and 266-1 to 266-M, and receive processors 242 and 282 are each examples of means for receiving one or more acknowledgement (ACK) frames from the device in response to transmitting the one or more data frames. The transmit/receive interface 930 and transceivers 226-1 to 226-N and 266-1 to 266-M are each examples of means for configuring an antenna to receive the one or more ACK frames 370 with an antenna radiation pattern having a primary lobe aimed substantially at the device based on the second beam training sequence.

The processing system 920 and frame builders 262 are each examples of means for generating a first frame including a Clear to Send (CTS) portion and a first beam training sequence. The transmit/receive interface 930 and transmit processors 224 and 264 are each examples of means for outputting the first frame for transmission to a device. The processing system 920, controllers 234 and 274, and frame builders 262 are each examples of means for generating the first frame in response to receiving a Request to Send (RTS) frame from the device.

The transmit/receive interface 930 and transceivers 226-1 to 226-N and 266-1 to 266-M are each examples of means for configuring an antenna to receive the RTS frame in an omnidirectional manner. The processing system 920, controllers 234 and 274, and frame builders 262 are each examples of means for generating the first frame in response to receiving a second frame comprising a Request to Send (RTS) portion and a second beam training sequence. The transmit/receive interface 930, controllers 234 and 274, and transceivers 226-1 to 226-N and 266-1 to 266-M are each examples of means for receiving one or more data frames from the device in response to transmitting the first frame.

The transmit/receive interface 930, controllers 234 and 274, and transceivers 226-1 to 226-N and 266-1 to 266-M are each examples of means for configuring an antenna to receive the one or more data frames with an antenna radiation pattern having a primary lobe aimed substantially at the device based on a second frame comprising an RTS portion and a second beam training sequence. The processing system 920 and frame builders 262 are each examples of means for generating one or more acknowledgement (ACK) frames in response to receiving the one or more data frames. The transmit/receive interface 930 and transmit processors 224 and 264 are each examples of means for outputting the one or more ACK frames 370 for transmission to the device. The transmit/receive interface 930, controllers 234 and 274, and transceivers 226-1 to 226-N and 266-1 to 266-M are each examples of means for configuring an antenna to transmit the one or more ACK frames 370 with an antenna radiation pattern having a primary lobe aimed substantially at the device based on a second frame comprising an RTS portion and a second beam training sequence.

The processing system 920 and receive processors 242 and 282 are each examples of means for receiving a first frame comprising a first Request to Send (RTS) portion and a first beam training sequence from a first device. The transmit/receive interface 930, controllers 234 and 274, and transceivers 226-1 to 226-N and 266-1 to 266-M are each examples of means for configuring an antenna in a first configuration based on the first beam training sequence. The processing system 920 and frame builders 262 are each examples of means for generating a second frame. The transmit/receive interface 930 and transmit processors 224 and 264 are each examples of means for outputting the second frame for transmission to a second device via the antenna while the antenna is configured in the first configuration.

The processing system 920 and controllers 234 and 274 are each examples of means for determining a duration in which the first device will be communicating with a third device based on the first RTS portion of the first frame. The transmit/receive interface 930, controllers 234 and 274, and transceivers 226-1 to 226-N and 266-1 to 266-M are each examples of means for reconfiguring the antenna in a second configuration in response to determining the first device is no longer communicating with the third device based on the duration. The processing system 920 and frame builders 262 are each examples of means for generating a third frame. The transmit/receive interface 930 and transmit processors 224 and 264 are each examples of means for outputting the third frame for transmission to the second device via the antenna while the antenna is configured in the second configuration.

The processing system 920 and the receive processors 242 and 282 are each examples of means for receiving a third frame including a Clear to Send (CTS) portion and a second beam training sequence from a third device. The processing system 920 and controllers 234 and 274 are each examples of means for determining a duration in which the first device will be communicating with the third device based on at least one of the first RTS portion of the first frame or the CTS portion of the third frame. The transmit/receive interface 930, controllers 234 and 274, and transceivers 226-1 to 226-N and 266-1 to 266-M are each examples of means for reconfiguring the antenna in a second configuration in response to determining that the first device is no longer communicating with the third device based on the duration. The processing system 920 and frame builders 262 are each examples of means for generating a third frame. The transmit/receive interface 930 and transmit processors 224 and 264 are each examples of means for outputting the third frame for transmission to the second device via the antenna while the antenna is configured in the second configuration.

The processing system 920 and receive processors 242 and 282 are each examples of means for receiving a first frame comprising a first Clear to Send (CTS) portion and a first beam training sequence from a first device. The transmit/receive interface 930, controllers 234 and 274, and transceivers 226-1 to 226-N and 266-1 to 266-M are each examples of means for configuring an antenna in a first configuration based on the first beam training sequence. The processing system 920 and frame builders 262 are each examples of means for generating a second frame. The transmit/receive interface 930 and transmit processors 224 and 264 are each examples of means for outputting the second frame for transmission to a second device via the antenna while the antenna is configured in the first configuration.

The processing system 920 and controllers 234 and 274 are each examples of means for determining a duration in which the first device will be communicating with a third device based on the first CTS portion of the first frame. The transmit/receive interface 930, controllers 234 and 274, and transceivers 226-1 to 226-N and 266-1 to 266-M are each examples of means for reconfiguring the antenna in a second configuration in response to determining the first device is no longer communicating with the third device based on the duration. The processing system 920 and frame builders 262 are each examples of means for generating a third frame. The transmit/receive interface 930 and transmit processors 224 and 264 are each examples of means for outputting the third frame for transmission to the second device via the antenna while the antenna is configured in the second configuration.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth.

A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to generate a first frame including a duration field, an address field, and a first beam training sequence, wherein the duration field includes information indicating an estimated duration during which a communication medium will be used for communicating with a device, wherein the address field includes information identifying at least one of the apparatus or the device, and wherein the first beam training sequence is based on a Golay sequence; and
   an interface configured to output the first frame for transmission to the device.

2. The apparatus of claim 1, wherein the first frame comprises a Request to Send (RTS) portion including the duration field and the address field.

3. The apparatus of claim 1, wherein the processing system is further configured to configure an antenna to transmit the first frame with antenna radiation pattern having a primary lobe aimed substantially at the device.

4. The apparatus of claim 1, wherein the processing system is further configured to receive a second frame from the device, wherein the second frame comprises a Clear to Send (CTS) portion and a second beam training sequence.

5. The apparatus of claim 4, wherein the processing system is further configured to generate at least one of a data or control frame in response to receiving the second frame, and wherein the interface is further configured to output the at least one of the data or control frame for transmission to the device.

6. The apparatus of claim 5, wherein the processing system is further configured to receive at least one of an acknowledgement (ACK), data, or ACK and data frame from the device after the transmission of the at least one of the data or control frame.

7. The apparatus of claim 6, wherein the processing system is further configured to configure an antenna to receive the at least one of the ACK, data, or ACK and data frame with an antenna radiation pattern having a primary lobe aimed substantially at the device based on the second beam training sequence.

8. The apparatus of claim 4, wherein the processing system is further configured to configure an antenna to transmit, receive, or transmit and receive at least one of the data or control frame with an antenna radiation pattern having a primary lobe aimed substantially at the device based on the second beam training sequence.

9. The apparatus of claim 1, wherein the estimated duration includes an estimated duration of one or more data frames to be transmitted to the device.

10. The apparatus of claim 1, wherein the interface is configured to transmit the first frame in a millimeter wave spectrum, via a single carrier, or in accordance with IEEE 802.11ad, 802.11ay, or 802.11aj protocol.

11. The apparatus of claim 1, wherein the first frame comprises a Clear to Send (CTS) portion.

12. The apparatus of claim 1, wherein the processing system is further configured to receive a Request to Send (RTS) frame from the device, and wherein the processing system is further configured to generate the first frame in response to receiving the RTS frame.

13. The apparatus of claim 12, wherein the processing system is further configured to configure an antenna to receive the RTS frame in an omnidirectional manner.

14. The apparatus of claim 1, wherein the processing system is further configured to receive a second frame comprising a Request to Send (RTS) portion and a second beam training sequence from the device, and wherein the processing system is further configured to generate the first frame in response to receiving the second frame.

15. The apparatus of claim 14, wherein the processing system is further configured to configure an antenna to receive the second frame in an omnidirectional manner.

16. The apparatus of claim 14, wherein the processing system is further configured to configure an antenna to transmit the first frame with an antenna radiation pattern having a primary lobe aimed substantially at the device based on the second beam training sequence.

17. The apparatus of claim 1, wherein the processing system is further configured to receive at least one of a data or control frame from the device after the transmission of the first frame.

18. The apparatus of claim 17, wherein the processing system is further configured to receive a second frame comprising an RTS portion and a second beam training sequence from the device, and wherein the processing system is further configured to configure an antenna to receive the at least one of the data or control frame based on the second beam training sequence.

19. The apparatus of claim 17, wherein the processing system is further configured to generate at least one of an acknowledgement (ACK), data, or ACK and data frame in response to receiving the at least one of the data or control frame, and wherein the interface is configured to output the at least one of the ACK, data, or ACK and data frame for transmission to the device.

20. The apparatus of claim 19, wherein the processing system is further configured to receive a second frame comprising an RTS portion and a second beam training sequence from the device, and wherein the processing system is further configured to configure an antenna to transmit the at least one of the ACK, data, or ACK and data frame with an antenna radiation pattern having a primary lobe aimed substantially at the device based on the second beam training sequence.

21. The apparatus of claim 1, wherein the processing system is further configured to:
receive a second frame comprising a second beam training sequence from a second device;
configure an antenna in a configuration based on the second beam training sequence; and
generate a second frame; and
wherein the interface is configured to output the first frame for transmission to the device via the antenna while the antenna is being configured per the configuration.

22. The apparatus of claim 1, wherein the first frame comprises a CTS portion including the duration field and the address field, and wherein the information in the address field identifies the apparatus.

23. The apparatus of claim 1, wherein the information in the address field identifies a set of devices including the device, and wherein the interface is further configured to output the first frame for transmission to the set of devices.

24. The apparatus of claim 1, wherein the processing system is further configured to:
receive a second frame including a second beam training sequence from a second device; and
configure an antenna to generate an antenna radiation pattern with a null aimed substantially at the second device for transmitting the first frame to the device.

25. The apparatus of claim 24, wherein the processing system is configured to determine that the apparatus is not an intended receiving device of the second frame, and wherein the processing system is configured to configure the antenna to generate the antenna radiation pattern with the null aimed substantially at the second device in response to determining that the apparatus is not the intended receiving device of the second frame.

26. A method for wireless communications, comprising:
generating a first frame including a duration field, an address field, and a first beam training sequence, wherein the duration field includes information indicating an estimated duration during which a communication medium will be used by an apparatus to communicate with a device, wherein the address field includes information identifying at least one of the apparatus or the device, and wherein the first beam training sequence is based on a Golay sequence; and
outputting the first frame for transmission to the device.

27. A wireless node, comprising:
at least one antenna;
a processing system configured to generate a frame including a duration field, an address field, and a beam training sequence, wherein the duration field includes information indicating an estimated duration during which a communication medium will be used for communicating with a device, wherein the address field includes information identifying the at least one of the wireless node or the device, and wherein the beam training sequence is based on a Golay sequence; and
an interface configured to output the frame for transmission to the device via the at least one antenna.

* * * * *